(12) United States Patent
Sawada et al.

(10) Patent No.: US 7,577,504 B2
(45) Date of Patent: Aug. 18, 2009

(54) VEHICLE STABILITY CONTROL SYSTEM

(75) Inventors: Mamoru Sawada, Yokkaichi (JP);
Toshiki Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 163 days.

(21) Appl. No.: 11/076,295

(22) Filed: Mar. 9, 2005

(65) Prior Publication Data
US 2005/0200088 A1 Sep. 15, 2005

(30) Foreign Application Priority Data
Mar. 9, 2004 (JP) ............................. 2004-065927

(51) Int. Cl.
*B60T 8/24* (2006.01)
*B60T 8/32* (2006.01)
*B60T 7/12* (2006.01)
*G05B 13/00* (2006.01)
*G05B 11/00* (2006.01)

(52) U.S. Cl. .............................. 701/38; 701/36; 701/65; 701/69; 701/72; 701/90; 701/91; 700/29; 700/44

(58) Field of Classification Search ...................... 701/1, 701/40, 70, 71, 72, 301
See application file for complete search history.

(56) References Cited

U.S. PATENT DOCUMENTS

| | | | | |
|---|---|---|---|---|
| 4,761,022 A | * | 8/1988 | Ohashi et al. | 280/5.504 |
| 5,270,930 A | * | 12/1993 | Ito et al. | 701/69 |
| 5,376,868 A | * | 12/1994 | Toyoda et al. | 318/587 |
| 5,406,486 A | | 4/1995 | Kamio et al. | |
| 5,481,459 A | * | 1/1996 | Bungeler | 701/37 |
| 5,500,798 A | * | 3/1996 | Inagaki | 701/37 |
| 5,519,612 A | * | 5/1996 | Liubakka et al. | 701/37 |
| 5,540,298 A | | 7/1996 | Yoshioka et al. | |
| 5,572,425 A | * | 11/1996 | Levitt et al. | 701/37 |
| 5,752,211 A | * | 5/1998 | Takasaki et al. | 701/69 |

(Continued)

FOREIGN PATENT DOCUMENTS

JP 61-232963 10/1986

(Continued)

OTHER PUBLICATIONS

Office Action dated Jun. 26, 2007 for corresponding Japanese Patent Application No. 2004-065927.

(Continued)

*Primary Examiner*—Jack W. Keith
*Assistant Examiner*—Jonathan M Dager
(74) *Attorney, Agent, or Firm*—Harness, Dickey & Pierce, PLC

(57) ABSTRACT

A vehicle stability control system includes a basic request driving force computing unit, a front and rear wheel load computing unit, a virtual turning radius estimating unit, a target value computing unit, and a vibration damping correction controlling unit. The basic request driving force computing unit computes a physical quantity so as to generate the basic request driving force requested by a driver. The front and rear wheel load computing unit detect a load applied to the wheels. The virtual turning radius estimating unit estimates a virtual turning radius. The target value computing unit computes a target value of a stability factor. The vibration damping correction controlling unit corrects the physical quantity so as to follow the target value. The system generates the driving force for the driving wheel.

5 Claims, 14 Drawing Sheets

U.S. PATENT DOCUMENTS

| | | | |
|---|---|---|---|
| 6,064,931 A * | 5/2000 | Sawada et al. | 701/41 |
| 6,081,761 A * | 6/2000 | Harada et al. | 701/72 |
| 6,182,001 B1 * | 1/2001 | Sugai et al. | 701/78 |
| 6,199,001 B1 * | 3/2001 | Ohta et al. | 701/51 |
| 6,338,022 B1 * | 1/2002 | Shinmura et al. | 701/301 |
| 6,339,739 B1 * | 1/2002 | Folke et al. | 701/70 |
| 6,360,150 B1 * | 3/2002 | Fukushima et al. | 701/41 |
| 6,424,907 B1 | 7/2002 | Rieth et al. | |
| 6,571,176 B1 * | 5/2003 | Shinmura et al. | 701/301 |
| 6,575,261 B2 * | 6/2003 | Mori et al. | 180/248 |
| 6,584,399 B2 | 6/2003 | Koibuchi | |
| 6,604,036 B2 * | 8/2003 | Pallot | 701/48 |
| 6,659,570 B2 * | 12/2003 | Nakamura | 303/146 |
| 6,701,224 B1 * | 3/2004 | Klusemann | 701/1 |
| 6,940,423 B2 * | 9/2005 | Takagi et al. | 340/932.2 |
| 6,941,213 B2 * | 9/2005 | Yasui et al. | 701/80 |
| 7,065,442 B2 * | 6/2006 | Sakata | 701/72 |
| 7,151,991 B2 * | 12/2006 | Iida | 701/69 |
| 7,216,024 B1 * | 5/2007 | Abels et al. | 701/50 |
| 7,440,834 B2 * | 10/2008 | Yamaguchi et al. | 701/69 |
| 2002/0107106 A1 * | 8/2002 | Kato et al. | 477/110 |
| 2002/0153770 A1 * | 10/2002 | Matsuno et al. | 303/146 |
| 2003/0036839 A1 * | 2/2003 | Han et al. | 701/70 |
| 2003/0200016 A1 * | 10/2003 | Spillane et al. | 701/36 |
| 2004/0030479 A1 * | 2/2004 | Arndt et al. | 701/70 |
| 2004/0133326 A1 * | 7/2004 | Ghoneim et al. | 701/48 |
| 2004/0152562 A1 * | 8/2004 | Cullen et al. | 477/107 |
| 2004/0162663 A1 * | 8/2004 | Kogure et al. | 701/72 |
| 2005/0049761 A1 * | 3/2005 | Kataoka et al. | 701/1 |
| 2005/0149240 A1 * | 7/2005 | Tseng et al. | 701/38 |

FOREIGN PATENT DOCUMENTS

| | | |
|---|---|---|
| JP | 02-274669 | 8/1990 |
| JP | 11-180173 | 7/1999 |
| JP | 11-278081 | 10/1999 |
| JP | 2000-095083 | 4/2000 |
| JP | 2000-168599 | 6/2000 |
| JP | 2003-175749 | 6/2003 |
| WO | WO 00/03900 | 1/2000 |

OTHER PUBLICATIONS

Office Action dated Feb. 19, 2008 for corresponding Japanese Patent Application No. 2004-065927 and English translation thereof.

* cited by examiner

LATERAL TRANSLATION MOTION

TURNING MOTION

ACCELERATING

BRAKING

TURNING

PITCHING OSCILLATION

VEHICLE STABILITY CONTROL SYSTEM

CROSS REFERENCE TO RELATED APPLICATIONS

This application is based upon and claims the benefit of priority of Japanese Patent Application No. 2004-65927, filed on Mar. 9, 2004, the contents of which are incorporated herein by reference.

FIELD OF THE INVENTION

The present invention relates to a vehicle stability control system and a vehicle stability control method for controlling a change in cornering power due to a change in ground load of each of front and rear wheels so as to stabilize the running of a vehicle.

BACKGROUND OF THE INVENTION

Conventionally, in vehicle running control, lane maintenance control for controlling a vehicle so as to ensure the running of the vehicle in a lane indicated with a white line or the like is known. An example of such a control is disclosed in Japanese Patent Laid-Open Publication No.2000-168599.

In the lane maintenance control, a white line drawn on a running road surface is recognized by a vehicle-mounted camera or the like. A steering angle is automatically controlled so that the vehicle can run along a road path indicated with the white line. As a result, the vehicle can run along a correct path without drifting from the white line drawn on the running road surface.

However, although the running without drifting from the white line is made possible by each of the above described controls, a driver has to correct steering in accordance with the behavior of the vehicle because the steering angle is merely adjusted in relation with the white line. It is desired to find a fundamental reason for imposing such a driving burden on the driver so as to ease the driving burden.

The inventors of the present invention have keenly examined the reason. As a result, they concluded that a fluctuation in the behavior of the vehicle body due to the road surface or the other external factors (road surface disturbance) caused the disturbance of the attitude of the vehicle body or the running path, and the resulting vehicle body attitude or vibration induced a disturbance component even in a steering operation itself of the driver, thereby generating the driving burden as described above.

Specifically, the running path of the vehicle is considered as an integral of ever-changing attitudes and positions of the vehicle for finite time. Therefore, when the vehicle drifts from a driving line intended by the driver due to undesired behavior of the vehicle, the driver is forced to perform a corrective operation.

It is believed that the problem of the above-described effects of driver operation disturbance or road surface disturbance is generated not only during the lane maintenance control but also in a normal turning operation and the like and therefore is desired to be solved in the same way as described above.

SUMMARY OF THE INVENTION

In view of the above points, the present invention has an object of suppressing the effects of driver operation disturbance or road surface disturbance to stabilize vehicle body attitude or vehicle characteristics. Another object is to ease a driving burden on a driver.

In order to achieve the above-described objects, the inventors of the present invention sought a fundamental reason of forcing a driver to perform a corrective operation. As a result, front and rear wheel ground loads applied to the respective wheels are fluctuated by the above-described driver operation disturbance or road surface disturbance. It is found that the above-described corrective operation is required because control is not performed in view of cornering power even though the cornering power of each tire fluctuates due to the fluctuations of the ground loads.

The fluctuation of the ground loads on the front and rear wheels will be described. The fluctuation of the front and rear wheel ground loads occurs due to, for example, pitching oscillation and the like. The pitching oscillation occurs around a horizontal axis of a vehicle about the center of gravity of the vehicle as the center. Energy generated by the pitching oscillation is referred to as pitching oscillation energy.

The pitching oscillation is generated by squat in driving (acceleration) and nosedive in braking (deceleration) and steering (turning). FIG. 13 shows these states.

As in FIG. 13A, in driving (acceleration), since the vehicle body cannot follow the revolutions of wheels to be left behind. Therefore, the front side (the nose) of the vehicle ascends about the center of gravity of the vehicle as the center to cause squat. Moreover, as in FIG. 13B, in braking (deceleration), the vehicle body cannot follow the deceleration of wheels due to inertia when a braking force is generated for the wheels. As a result, nosedive, the front side (the nose) descent of the vehicle about the center of gravity of the vehicle as the center, occurs. As in FIG. 13C, in steering (turning), cornering drag occurs. The wheels decelerate based on it, resulting in the nosedive as in braking (deceleration).

Rotational oscillation occurring around the center of gravity of the vehicle as the center such as squat and nosedive as described above corresponds to the pitching oscillation. The energy for generating it is pitching oscillation energy. Such pitching oscillation energy is constantly generated while the vehicle is running.

The relation of the respective ground loads of the front and rear wheels and forces exerted on the wheels is fluctuated by such pitching oscillation or the like with respect to that in steady-state running. Specifically, as shown in FIG. 13A, a front wheel ground load Wf becomes smaller and a rear wheel ground load Wr becomes larger to increase a driving torque reaction force in squat as compared with that in steady-state running. As shown in FIG. 13B, the front wheel ground load Wf becomes larger and the rear wheel ground load Wr becomes smaller in nosedive due to deceleration as compared with that in steady-state running. Therefore, a braking force on the front wheel becomes larger, whereas a braking force on the rear wheel becomes smaller. Moreover, as shown in FIG. 13C, even in nosedive due to turning, the front wheel ground load Wf becomes larger and the rear wheel ground load Wr becomes smaller as compared with those in steady-state running.

Since the ground loads Wf and Wr fluctuate as described above, the cornering power fluctuates. As a result, the turning of the vehicle is not stabilized to impose an operation burden such as a corrective operation of steering and the like on the driver.

The relation between the pitching oscillation, the front and rear wheel ground loads, and the front and rear wheel cornering powers is shown as timing charts. As a result, it is found that the result shown in FIG. 14 is established. Specifically, if it is assumed that the pitching oscillation as shown in FIG. 14A occurs, the front wheel and rear wheel loads Wf and Wr are the sums of a front wheel load Wfo and a rear wheel load Wro in steady-state running and ΔWf and ΔWr corresponding to the amounts of fluctuation due to the pitching oscillation, respectively, as expressed by Formula 1.

$$Wf = Wfo + \Delta Wf, \; Wr = Wro + \Delta Wr \quad \text{(Formula 1)}$$

Therefore, each of the front wheel and rear wheel loads Wf and Wr becomes a waveform corresponding to a waveform of the pitching oscillation. Then, as shown in FIG. 14C, even front wheel and rear wheel cornering powers Kcf and Kcr are the products of the front wheel and rear wheel loads Wf and Wr and a factor Cw in a linear area of a tire characteristic. Therefore, the waveforms of cornering powers Kcfo and Kcro in a steady state become similar to those of the front wheel and rear wheel loads Wf and Wr, respectively.

Accordingly, if a shift of the front and rear wheel ground loads generated by the pitching oscillation or the like is used to correct an axle torque generated by the engine so as to stabilize a steering characteristic governing the lateral motion of the vehicle, it is believed that the disturbance of vehicle body attitude and a vehicle characteristic can be efficiently restrained.

Next, the inventors of the present invention have examined a state quantity in a vehicle while setting a sprung oscillation model.

With reference to a schematic view of a sprung vehicle oscillation model shown in FIG. 15, a state quantity in a vehicle will be described.

The sprung vehicle oscillation model shown in FIG. 15 assumes that, in response to the amount of change ΔTr in torque reaction force on the basis of an arbitrary steady state, oscillation about the center of pitching is generated in a sprung part. In this case, the sprung oscillation is assumed as follows. Using the vehicle body to resemble a flat plate consisting of an arbitrary base plane parallel to a horizontal direction, tires are provided for the flat plate so as to be supported by a suspension, and an engine, a transmission and the like are also supported by the vehicle body through a mount including a spring element.

In the sprung oscillation model, each constant is set as follows. First, for the respective front and rear wheels provided on a base plane B, spring constants of the suspension are Kf and Kr, attenuation coefficients of the suspension are Cf and Cr, a weight of the engine and the transmission is m, a spring constant in the engine mount is Ke, and its attenuation coefficient is Ce.

Moreover, a tire radius is r, a sprung vehicle body mass [kg] is M, a mass [kg] of the engine and the transmission (T/M) is m, a wheel base [m] is L, a distance [m] between the center of gravity of the vehicle and a front wheel axis is Lf, a distance [m] between the center of gravity of the vehicle and a rear wheel axis is Lr, a distance [m] between the center of gravity of the vehicle and the engine and the center of gravity of the T/M is Le, and a distance [m] between a vehicle body base line (a height of the base plane) and a height of the center of gravity of the vehicle is hc.

A pitching moment of inertia [kgm$^2$] of the vehicle body is Ip, and an acceleration of gravity [m/s$^2$] is g.

On the other hand, for independent variables, a vertical displacement [m] of the sprung vehicle body is x, a vertical displacement of the engine and the T/M is xe, and a pitch angle [rad] about the virtual pitching center is θp.

First, since the virtual pitch angle with respect to the center of pitching is represented as θp, the amount of displacement about the pitch center in the front wheel axis distant from the center of pitching by Lf is Lfθp and the amount of displacement about the pitch center in the rear wheel axis distant from the center of pitching by Lr is Lrθp. Then, the amount of displacement about the pitch center in the rear wheel distant from the center of pitching by Lr is Lrθp. Therefore, vertical displacements of the vehicle body are x+Lfθp on the front wheel side and x−Lfθp on the rear wheel side.

Accordingly, an equation of motion about the pitch center of the vehicle body is expressed as Formula 2.

$$\begin{aligned} Ip\theta p'' = & -Lf\{Kf(x + Lf\theta p) + Cf(x' + Lf\theta p')\} - \\ & Le\{Ke(x + Le\theta p - xe) + Ce(x' + Le\theta p' - xe')\} + \\ & Lr\{Kr(x - Lr\theta p) + Cr(x' + Lr\theta p')\} + \\ & hc\theta pMg + (hcg - hc)\Delta Tr/r + \Delta Tr \end{aligned} \quad \text{(Formula 2)}$$

Equations of a vertical motion of the vehicle body and a vertical motion of the engine 1 and the T/M are expressed as Formulae 3 and 4.

$$\begin{aligned} Mx'' = & \\ & -Kf(x + Lf\theta p) - Cf(x' + Lf\theta p') - Ke(x + Le\theta p - xe) - \\ & Ce(x' + Le\theta p' - xe') - Kr(x - Lr\theta p) - Cr(x' - Lr\theta p') \end{aligned} \quad \text{(Formula 3)}$$

$$mxe'' = -Ke(xe - x - Le\theta p) - Ce(xe' - x' - Le\theta p') \quad \text{(Formula 4)}$$

Then, xe", x" and θp" are obtained from Formulae 2 to 4 as Formulae 5 to 7, respectively.

$$\begin{aligned} xe'' = & -Ke/m^* xe - Ce/m^* xe' + Ke/m^* x + \\ & Ce/m^* x' + KeLe/m^* \theta p + CeLe/m^* \theta p' \end{aligned} \quad \text{(Formula 5)}$$

$$\begin{aligned} x'' = & Ke/M^* xe + Ce/M^* xe' - (Ke + Kf + Kr)/M^* x - \\ & (Ce + Cf + Cr)/M^* x' - (KfLf + KeLe - KrLr)/M^* \theta p - \\ & (CfLf + CeLe - CrLr)/M^* \theta p' \end{aligned} \quad \text{(Formula 6)}$$

$$\begin{aligned} \theta p'' = & KeLe/Ip^* xe + \\ & CeLe/Ip^* xe' - (KfLf + KeLe - KrLr)/Ip^* x - \\ & (CfLf + CeLe - CrLr)/Ip^* x' - \\ & (KfLf^2 + KeLe^2 + KrLr^2 - hcMg)/Ip^* \theta p - \\ & (CfLf^2 + CeLe^2 + CrLr^2)/Ip^* \theta p' + \\ & \{1 + (hcg - hc)/r\}/Ip^* \Delta Tr \end{aligned} \quad \text{(Formula 7)}$$

Therefore, setting the respective state quantities xe=x1, xe'=x2, x=x3, x'=x4, θp=x5, θp'=x5, ΔTr=u and setting factors of the variables in each of Formulae described above to a1 to a6, b1 to b6, c1 to c6, and p1. Then, each of the above Formulae is converted as follows.

$$\begin{aligned} xe'' & = a1xe + a2xe' + a3x + a4x' + a5\theta p + a6\theta p' \\ & = a1 \times 1 + a2 \times 2 + a3 \times 3 + a4 \times 4 + \\ & \quad a5 \times 5 + a6 \times 6 \end{aligned} \quad \text{(Formula 8)}$$

$$\begin{aligned} x'' & = b1xe + b2xe' + b3x + b4x' + b5\theta p + b6\theta p' \\ & = b1 \times 1 + b2 \times 2 + b3 \times 3 + b4 \times 4 + \\ & \quad b5 \times 5 + b6 \times 6 \end{aligned} \quad \text{(Formula 9)}$$

-continued $$\theta p'' = c1xe + c2xe' + c3x + c4x' + c5\theta p + \qquad \text{(Formula 10)}$$
$$c6\theta p' + p1u$$
$$= c1 \times 1 + c2 \times 2 + c3 \times 3 + c4 \times 4 +$$
$$c5 \times 5 + c6 \times 6 + p1u$$

where, in the above Formulae 8 to 10, $a1=-Ke/m$, $a2=-Ce/m$, $a3=Ke/m$, $a4=Ce/m$, $a5=KeLe/m$, $a6=CeLe/m$, $b1=Ke/M$, $b2=Ce/M$, $b3=-(Ke+Kr+Kr)/M$, $b4=-(Ce+Cf+Cr)/M$, $b5=-(KfLf+KeLe-KrLr)/M$, $b6=-(CfLf+CeLe-CrLr)/M$, $c1=KeLe/Ip$, $c2=CeLe/Ip$, $c3=-(KfLf+KeLe-KrLr)/Ip$, $c4=-(CfLf+CeLe-CrLr)/Ip$, $c5=-(KfLf^2+KeLe^2+KrLr^2-hcMg)/Ip$, $c6=-(CfLf^2+CeLe^2+CrLr2)/Ip$, and $p1=\{1+(hcg-hc)/r\}/Ip$.

Moreover, since x1 to x6 are defined as described above, the following relations are also established.

$$x'1 = xe' = x2 \qquad \text{(Formula 11)}$$

$$x'2 = xe'' = a1x1 + a2x2 + a3x3 + a4x4 + a5x5 + a6x6 \qquad \text{(Formula 12)}$$

$$x'3 = x' = x4 \qquad \text{(Formula 13)}$$

$$x'4 = x' = b1x1 + b2x2 + b3x3 + b4x4 + b5x5 + b6x6 \qquad \text{(Formula 14)}$$

$$x'5 = \theta p' = x6 \qquad \text{(Formula 15)}$$

$$x'6 = \theta p'' = c1x1 + c2x2 + c3x3 + c4x4 + c5x5 + c6x6 + p1u \qquad \text{(Formula 16)}$$

Therefore, assuming that Formulae 11 to 16 are state space representations, a state equation is expressed by a determinant of 6 by 6. Formula 17 is simplified to be expressed as Formula 18.

$$\begin{bmatrix} x1' \\ x2' \\ x3' \\ x4' \\ x5' \\ x6' \end{bmatrix} = \begin{bmatrix} 0 & 1 & 0 & 0 & 0 & 0 \\ a1 & a2 & a3 & a4 & a5 & a6 \\ 0 & 0 & 0 & 1 & 0 & 0 \\ b1 & b2 & b3 & b4 & b5 & b6 \\ 0 & 0 & 0 & 0 & 0 & 1 \\ c1 & c2 & c3 & c4 & c5 & c6 \end{bmatrix} \begin{bmatrix} x1 \\ x2 \\ x3 \\ x4 \\ x5 \\ x6 \end{bmatrix} + \begin{bmatrix} 0 \\ 0 \\ 0 \\ 0 \\ 0 \\ p1 \end{bmatrix} u \qquad \text{[Formula 17]}$$

$$x' = Ax + Bu \qquad \text{(Formula 18)}$$

In this manner, the state equation of the sprung oscillation model is derived. Therefore, if an axle torque (a physical quantity corresponding to a driving force) generated by the engine is corrected based on the state equation, a steering characteristic (a stability factor) governing the lateral motion of the vehicle can be actively controlled.

Therefore, one aspect of the invention is characterized by including: a basic request driving force computing unit for computing a physical quantity corresponding to a basic request driving force so as to generate the basic request driving force requested by a driver for a driving wheel provided for a vehicle; a front and rear wheel static ground load computing unit for detecting a quasi-static ground load applied to each of front wheels and rear wheels in the vehicle; a virtual turning radius estimating unit for estimating a virtual turning radius in the vehicle; a target value computing unit for computing a target value of a stability factor based on the results of computations in the front and rear wheel load computing unit and the virtual turning radius estimating unit; and a vibration damping correction controlling unit for correcting a physical quantity corresponding to the basic request driving force computed by the basic request driving force computing unit so as to follow the target value computed by the target value computing unit, wherein a driving force in accordance with the corrected physical quantity corrected by the vibration damping correction controlling unit is generated for the driving wheel.

As described above, the physical quantity corresponding to the basic request driving force is corrected based on the quasi-static ground loads respectively applied to the front wheel and the rear wheel in the vehicle so as to follow the target value of the stability factor. Therefore, the stability factor can be stabilized so as to provide a turning radius ideal for each occasion in response to various surrounding environments that momentarily change. For example, the stabilization of each internal state quantity such as restrained pitching oscillation energy and the like is realized to enable the stabilization of a running state of the vehicle.

Therefore, the fluctuation of the behavior of the vehicle body due to the road surface or other external factors (the road surface disturbance) can be prevented from disturbing the vehicle body attitude or the running path. Since the disturbance of the attitude of the vehicle body or the vibration due to these factors is restrained, a steering operation by a driver for correcting the disturbance of the attitude of the vehicle body or the vibration is not needed any more. Therefore, a disturbance component can be prevented from being induced by the steering operation by the driver.

As the physical quantity corresponding to the basic request driving force, for example, there is a basic request torque.

Another aspect of the present invention is characterized in that the front and rear wheel ground load computing unit computes front and rear wheel static ground loads respectively applied to the front wheel and the rear wheel when the vehicle is running in a steady state, as the front and rear wheel ground loads, and the target value computing unit computes the target value of the stability factor based on the front and rear wheel static ground loads. In this manner, the target value of the stability factor can be set based on the front and rear wheel static ground loads.

Another aspect of the present invention is characterized by including an estimated road grade calculating unit for estimating a grade of the road surface on which the vehicle is running, wherein the front and rear wheel ground load computing unit computes front and rear static ground loads respectively applied to the front wheel and the rear wheel when the vehicle is running in a steady state, as the front and rear wheel ground loads, and computes an amount of fluctuation in the front and rear wheel ground loads in the case where the vehicle runs in the steady state on the estimated road grade based on the estimated road grade computed in the estimated road grade calculating unit so as to obtain a value taking the amounts of fluctuation generated by the estimated road grade into account from the front and rear wheel static ground loads as front and rear wheel ground loads, and the target value computing unit computes the target value of the stability factor based on the front and rear wheel ground loads taking the amounts of fluctuation in front and rear wheel ground loads generated by the estimated road grade into account.

As described above, the amounts of fluctuation in front and rear wheel ground loads in accordance with the road grade are obtained. The amounts of fluctuation in front and rear wheel ground loads generated by the road grade are subtracted from the respective static ground loads of the front wheel and the rear wheel to obtain front and rear wheel ground loads in accordance with the road grade.

Yet another aspect of the present invention is characterized in that the vibration damping correction controlling unit includes a state equation indicating a state quantity in the vehicle based on a sprung oscillation model in the vehicle and an output equation expressing the stability factor as the state quantity based on the state equation so as to correct the physical quantity corresponding to the basic request driving force based on a difference between the stability factor obtained from the output equation and the state quantity and the target value of the stability factor computed in the target value computing unit.

In this manner, the state equation expressing the state quantity in the vehicle based on the sprung oscillation model in the vehicle and the output equation expressing the stability factor as the state quantity based on the state equation are prestored in the vibration damping correction controlling unit. The stability factor is obtained from the output equation and the state quantity so that the physical quantity corresponding to the basic request driving force can be corrected based on the difference between the stability factor and its target value. As a result, the physical quantity corresponding to the basic request driving force is corrected so that the stability factor obtained from the output equation and the state quantity can follow the target value.

Yet another aspect of the present invention is characterized by including a running resistance disturbance estimating unit for estimating a running resistance disturbance applied to the wheels in the vehicle, wherein the vibration damping correction controlling unit obtains the state quantity in the state equation in view of the running resistance disturbance estimated by the running resistance disturbance estimating unit so as to obtain the stability factor based on the obtained state quantity and the output equation and to obtain a difference between the stability factor and its target value.

As described above, the running disturbance resistance is estimated by the running disturbance estimating unit so as to obtain the state quantity in the state equation in view of the running disturbance resistance. The running disturbance resistance is obtained, for example, based on a derivative value of a wheel speed of the front wheel and the weight of the vehicle, for example, by multiplying them.

A further aspect of the present invention is characterized by including image recognition means for taking an image of an external circumstance of the vehicle and for outputting image data, wherein the virtual turning radius estimating unit estimates the virtual turning radius based on an optical flow of the image data of a vehicle-mounted camera.

As described above, a running state of the vehicle can be detected based on the optical flow in the image data obtained by taking the image of the external circumstance of the vehicle. Therefore, the virtual turning radius can be estimated based on the optical flow.

A further aspect of the present invention is characterized in that the virtual turning radius estimating unit sets the virtual turning radius so that the vehicle gives priority to a lateral translational motion rather than to a turning motion in the case where an oncoming vehicle is present in the image data in the image recognition means and the oncoming vehicle or a person is distant from the own vehicle by a predetermined distance or more whereas the virtual turning radius estimating unit sets the virtual turning radius so that the vehicle gives priority to the turning motion rather than to the lateral translational motion in the case where the oncoming vehicle or the person is close to the own vehicle to be within the predetermined distance.

As described above, if the oncoming vehicle is distant from the own vehicle by the predetermined distance or more, the virtual turning radius is set so that the vehicle gives priority to the lateral translational motion rather than to the turning motion. Therefore, the own vehicle avoids the person without swerving, that is, moves as if the own vehicle laterally slid when it is viewed from the oncoming vehicle. Therefore, the own vehicle does not seem to stray onto the opposite lane. Accordingly, the driver of the oncoming vehicle can be less intimidated.

Moreover, if the oncoming vehicle is close to be within the predetermined distance from the own vehicle, the virtual turning radius is set so that the vehicle gives priority to the turning motion rather than to the lateral translational motion. Therefore, the worst case such as a collision can be avoided in the event of emergency such as dart out.

A still further aspect of the present invention is characterized by including vehicle speed detection means for generating an output in accordance with a vehicle speed in the vehicle, wherein the virtual turning radius estimating unit sets the virtual turning radius so that the vehicle gives priority to the lateral translational motion rather than to the turning motion when the vehicle speed detected by the vehicle speed detection means is higher than a predetermined speed and the vehicle is running at high speed, whereas the virtual turning radius estimating unit sets the virtual turning radius so that the vehicle gives priority to the turning motion rather than to the lateral translational motion when the vehicle speed detected by the vehicle speed detection means is lower than the predetermined speed and the vehicle is running at low speed.

As described above, when the vehicle speed is higher than the predetermined speed and the vehicle is running at high speed, the virtual turning radius is set so that the vehicle gives priority to the lateral translational motion to the turning motion. Therefore, during high-speed running, the vehicle does not turn so as to laterally move the nose to make a lane change, but the vehicle makes a lane change as if the vehicle laterally slid. Therefore, more sense of the security can be given to the driver.

Moreover, when the vehicle is running at low speed that is lower than the predetermined speed, the virtual turning radius is set so that the vehicle gives priority to the turning motion rather than the lateral translational motion. Therefore, during low-speed running, the vehicle can turn sharply, giving an impression that the vehicle is easy to turn to the driver.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
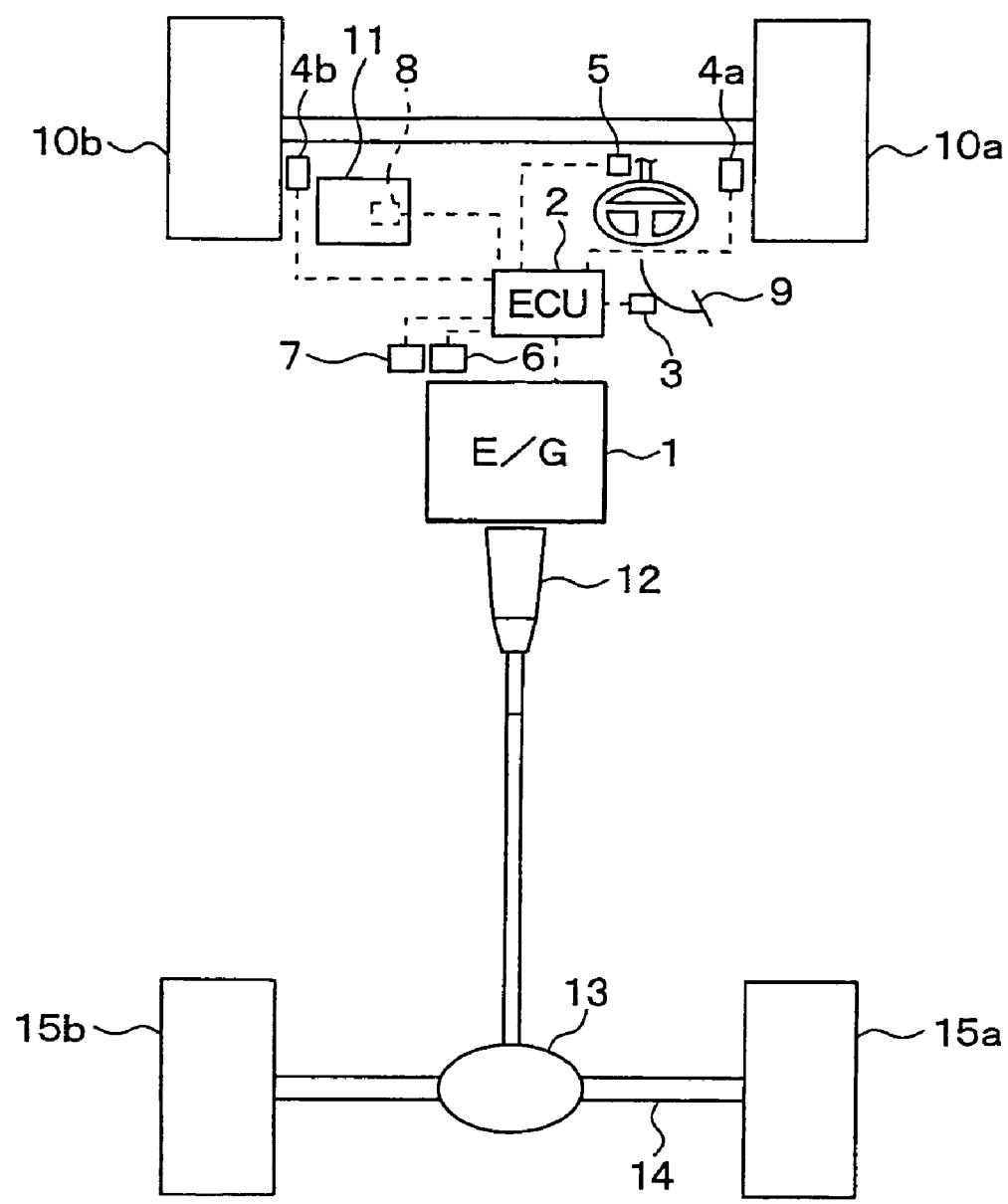
FIG. 1 is a schematic diagram of a vehicle stability control system of a first embodiment of the present invention.

Hereinafter, the embodiments of the present invention will be described based on the drawings. In each of the following embodiments, the same or equivalent parts are denoted by the same reference numerals in the drawings.

A vehicle stability control system of one embodiment of the present invention will be described. FIG. 1 shows a schematic structure of a vehicle stability control system in this embodiment. Although the description will be given assuming a driving mode of a vehicle is rear wheel drive in this embodiment, it is apparent that the present invention can be applied even to a front wheel drive vehicle and a four-wheel drive vehicle.

The vehicle stability control system in this embodiment adjusts a driving torque generated by an engine 1 provided for a vehicle so as to stabilize a fluctuation of a stability factor based on a shift of front and rear wheel loads due to pitching oscillation energy or the like, thereby stabilizing the attitude of a vehicle body or a vehicle characteristic.

In the vehicle stability control system shown in FIG. 1, the engine 1 is controlled by an engine ECU 2. Detection signals from an accelerator stroke sensor 3, front wheel speed sensors 4a and 4b, a rudder angle sensor 5, an intake air amount sensor 6, and an engine revolution sensor 7 are input to the engine ECU 2, whereas various information is input from a navigation ECU 8 provided for a navigation system.

The accelerator stroke sensor 3 outputs a detection signal in accordance with the amount of operation of an accelerator pedal 9. In the engine ECU 2, the amount of operation of the accelerator is obtained from the detection signal from the accelerator stroke sensor 3. A request axle torque corresponding to a request driving force in accordance with the amount of operation of the accelerator is obtained.

The front wheel speed sensors 4a and 4b are provided so as to correspond to both front wheels 10a and 10b serving as steering wheels, respectively, and are composed of the wheel speed sensor 4a for the right front wheel and the wheel speed sensor 4b for the left front wheel. Each of the wheel speed sensors 4a is constituted by a known sensor such as an electromagnetic pickup type one for outputting different detection signals in accordance with the rotation of teeth of a gear-type rotor provided for an axle so as to generate a detection signal in accordance with the rotation of each of the front wheels.

The rudder angle sensor 5 is a known one for outputting a detection signal in accordance with a steering angle of the front wheels of the vehicle, that is, an angle of inclination of the front wheels of the vehicle with respect to a longitudinal axis of the vehicle. For example, when a steering shaft pivots in accordance with a steering operation, it is converted into steering of the front wheels of the vehicle through a steering mechanism. Therefore, the steering angle sensor detects the amount of pivoting of the steering so as to output a detection signal in accordance with the steering angle of the front wheels of the vehicle.

The intake air amount sensor 6 and the engine revolution sensor 7 are both known ones provided for the engine 1. The intake air amount sensor 6 outputs a detection signal in accordance with the amount of intake air sucked into the engine, whereas the engine revolution sensor 7 outputs a detection signal in accordance with an engine revolution rate.

The navigation ECU 8 is, for example, provided for a main body 11 of the navigation system so as to transmit various information through an in-vehicle LAN (CAN) to the engine ECU 2. For example, the navigation ECU 8 transmits road information stored in a hard disk provided in the main body 11 or an information storage medium such as a DVD and information about a yaw angle calculated from a detection signal from a yaw rate sensor included in the navigation system to the engine ECU 2.

The engine ECU 2 performs various computations based on the detection signal from each of the sensors 3, 4a, 4b and 5 to 7 and various information transmitted from the navigation ECU 8 so as to adjust engine power based on the results of computations. As a result, an axle torque, which is transmitted through a transmission 12, a final reduction gear 13, and a driving shaft 14 to rear wheels 15a and 15b serving as driving wheels, is adjusted.

Figure 2:
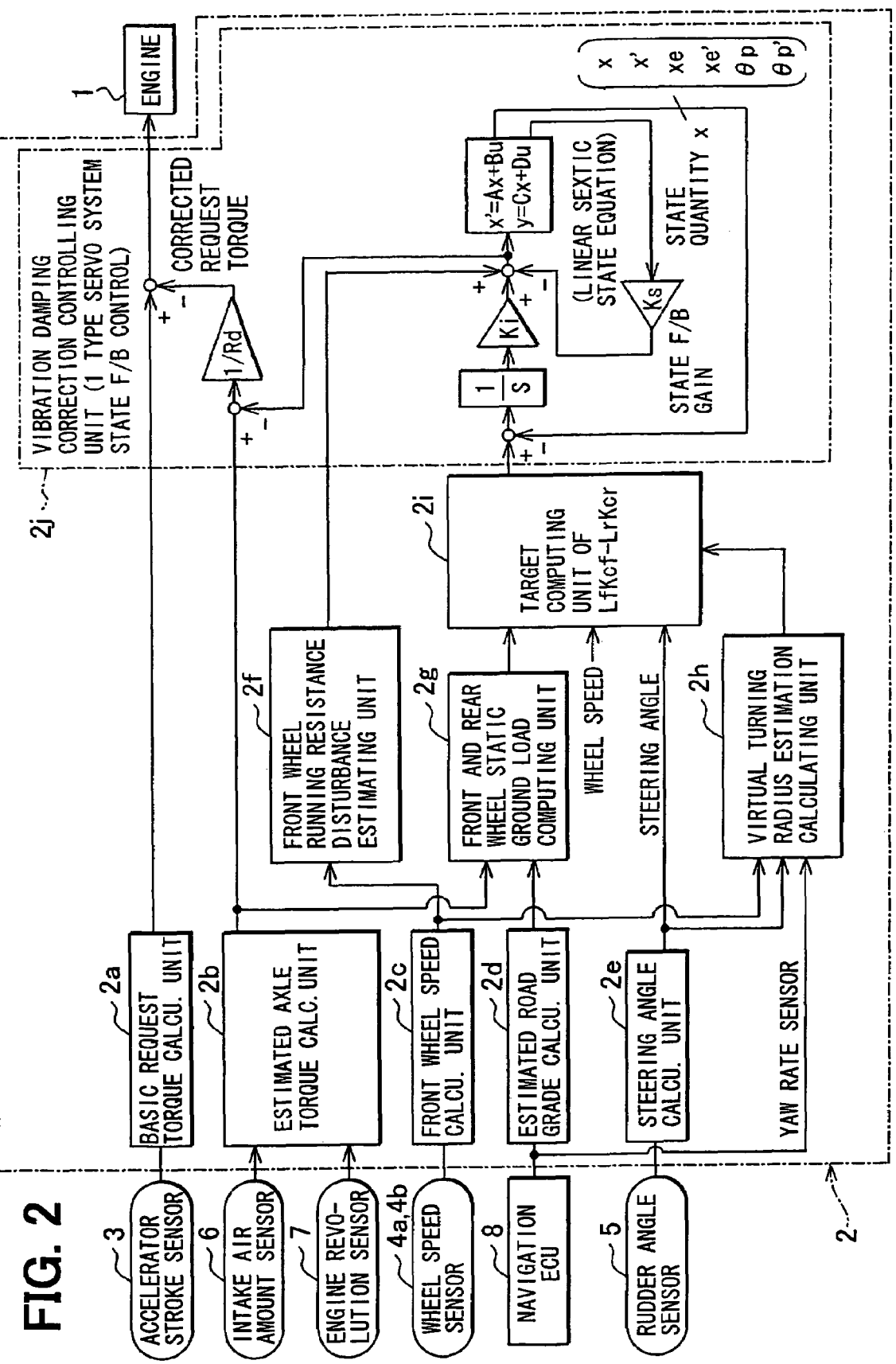
FIG. 2 is a block diagram of an engine electronic control unit of the vehicle stability control system of FIG. 1.

A block configuration of the engine ECU 2 is schematically shown in FIG. 2, so as to describe the details of the ECU 2 with reference to FIG. 2.

The engine ECU 2 is constituted by a microcomputer including a CPU, a RAM, a ROM, an I/O, and the like. An engine control program stored in the ROM is executed in the CPU to perform various computations so as to control the engine power by the engine 1.

Specifically, the engine ECU 2 includes, as shown in FIG. 2, a basic request torque calculating unit 2a, an estimated axle torque calculating unit 2b, a front wheel speed calculating unit 2c, an estimated road grade calculating unit 2d, a steering angle calculating unit 2e, a front wheel running resistance disturbance estimating unit 2f, a front and rear wheel static ground load computing unit 2g, a virtual turning radius estimation computing unit 2h, a target value computing unit 2i, and a vibration damping correction controlling unit 2j.

The basic request torque calculating unit 2a receives a detection signal output from the pedal stroke sensor 5 so as to obtain the amount of operation of the accelerator as a physical quantity based on the detection signal as well as to obtain a basic request torque corresponding to a basic request driving force in accordance with the amount of operation. The basic request torque obtained herein serves as a torque used for accelerating and decelerating the vehicle, that is, a basic request axle torque. Then, the result of computation in the basic request torque computing unit 2a is output to the vibration damping correction controlling unit 2j.

The estimated axle torque calculating unit 2b computes an estimated axle torque, that is, an axle torque, which is supposed to be generated when the result of detection is obtained, based on the detection signals from the intake air amount sensor 6 and the engine revolution sensor 7. The result of a computation in the estimated axle torque calculating unit 2b is output to the vibration damping correction controlling unit 2j and the front and rear wheel static ground load computing unit 2g.

The front wheel speed calculating unit 2c calculates a wheel speed of both the front wheels serving as the steering wheels based on the detection signals from both the wheel speed sensors 4a and 4b. The front wheel speed calculating unit 2c outputs signals to the front wheel running resistance disturbance estimating unit 2f and the virtual turning radius estimation computing unit 2h.

The estimated road grade calculating unit 2d receives road information from the navigation ECU 8 and extracts grade information of the driving road surface, which is included in the road information, so as to estimate a road grade. Then, the result of computation from the estimated road grade calculating unit 2d is output to the front and rear wheel static ground load computing unit 2g. Although the road grade is estimated based on the road information stored in the navigation system in this case, a vehicle front and rear driving force acceleration component may be removed from the detection signal from an acceleration sensor installed in the vehicle so as to estimate a road grade by a known method such as calculation of the road grade based on a gravity acceleration component.

The steering angle calculating unit 2e calculates a steering angle based on the detection signal from the rudder angle sensor 5 so as to output the result of computation to the virtual turning radius estimation computing unit 2h and the target value computing unit 2i.

The front wheel running resistance disturbance estimating unit 2f estimates a front wheel running resistance disturbance based on the computed front wheel speed. A running resistance in accordance with the wheel speed is generated for the front wheels. Therefore, the running resistance disturbance is estimated from the wheel speed. For example, a derivative value of the wheel speed is multiplied by a weight of the vehicle to obtain a force [N/m] in a translational direction. The result is further multiplied by a radius of a rolling wheel to obtain the running resistance disturbance as a moment [N] exerted on the rolling wheel.

The running resistance disturbance is obtained based on the single derivation of the wheel speed as described above. As a result, it is possible to obtain how much running resistance disturbance entered as a consequence regardless of the factor of the running resistance disturbance. Specifically, the running resistance disturbance occurs, for example, due to cornering drag generated by steering by a driver or the unevenness of a road surface. In any case, a change in wheel speed is generated as a result. Therefore, if the running resistance disturbance is calculated from the change (the derivative value) of the wheel speed, the running resistance disturbance, to which the rolling wheel was subjected, can be obtained regardless of the factor.

The running resistance disturbance may be estimated by prestoring the characteristics of the wheel speed and the running resistance disturbance in a memory in the engine ECU 2 and the like so as to select the running resistance disturbance in correlation with the wheel speed computed based on the characteristics.

The front and rear wheel static ground load computing unit 2g computes a static ground load in front and rear wheels based on the computed estimated axle torque and estimated road grade. Specifically, setting state quantities xe', x', θp', . . . that is, dot components to 0 in the state equation expressed as Formula 17 above, the front and rear wheel static ground load computing unit 2g calculates each of the state quantities in a steady state. The respective state quantities in this case are expressed as Formulae 19 to 21.

$$0 = a1xe + a3x + a5\theta p \quad \text{(Formula 19)}$$

$$0 = b1xe + b3x + b5\theta p \quad \text{(Formula 20)}$$

$$0 = c1xe + c3x + c5\theta p + p1\Delta Tr \quad \text{(Formula 21)}$$

Therefore, the Formulae can be converted into a determinant of matrix of 3 by 3 with the state quantities xe, x, and θp as Formula 22. Herein, xe_s, x_s, and θp_s are stationary solutions of the state quantities xe, x, and θp. Assuming that A is a factor expressed by a determinant of matrix of 3 by 3 as Formula 23, the stationary solutions xe_s, x_s, and θp_s can be expressed as Formula 24.

$$\begin{bmatrix} a1 & a3 & a5 \\ b1 & b3 & b5 \\ c1 & c3 & c5 \end{bmatrix} \begin{bmatrix} xe\_s \\ x\_s \\ \theta p\_s \end{bmatrix} = \begin{bmatrix} 0 \\ 0 \\ -p1\Delta Tr \end{bmatrix} \quad \text{[Formula 22]}$$

$$A = \begin{bmatrix} a1 & a3 & a5 \\ b1 & b3 & b5 \\ c1 & c3 & c5 \end{bmatrix} \quad \text{[Formula 23]}$$

$$\begin{bmatrix} xe\_s \\ x\_s \\ \theta p\_s \end{bmatrix} = \begin{bmatrix} a1 & a3 & a5 \\ b1 & b3 & b5 \\ c1 & c3 & c5 \end{bmatrix}^{-1} \begin{bmatrix} 0 \\ 0 \\ -p1\Delta Tr \end{bmatrix} \quad \text{[Formula 24]}$$

$$= \frac{1}{\det(A)} \begin{bmatrix} b3c5 - b5c3 & -(a3c5 - a5c3) & a3b5 - a5b3 \\ -(b1c5 - b5c1) & a1c5 - a5c1 & -(a1b5 - a5b1) \\ b1c3 - b3c1 & -(a1c3 - a3c1) & a1b3 - a3b1 \end{bmatrix} \begin{bmatrix} 0 \\ 0 \\ -p1\Delta Tr \end{bmatrix}$$

$$= \frac{1}{a1b3c5 + a3b5c1 + a5b1c3 - (a5b3c1 + a3b1c5 + a1b5c3)} \begin{bmatrix} -(a3b5 - a5b3)p1\Delta Tr \\ (a1b5 - a5b1)p1\Delta Tr \\ -(a1b3 - a3b1)p1\Delta Tr \end{bmatrix}$$

Static loads Wf_s and Wr_s respectively on the front wheel and the rear wheel in a steady state are obtained as follows based on an oscillation model shown in FIG. 3.

Figure 3:
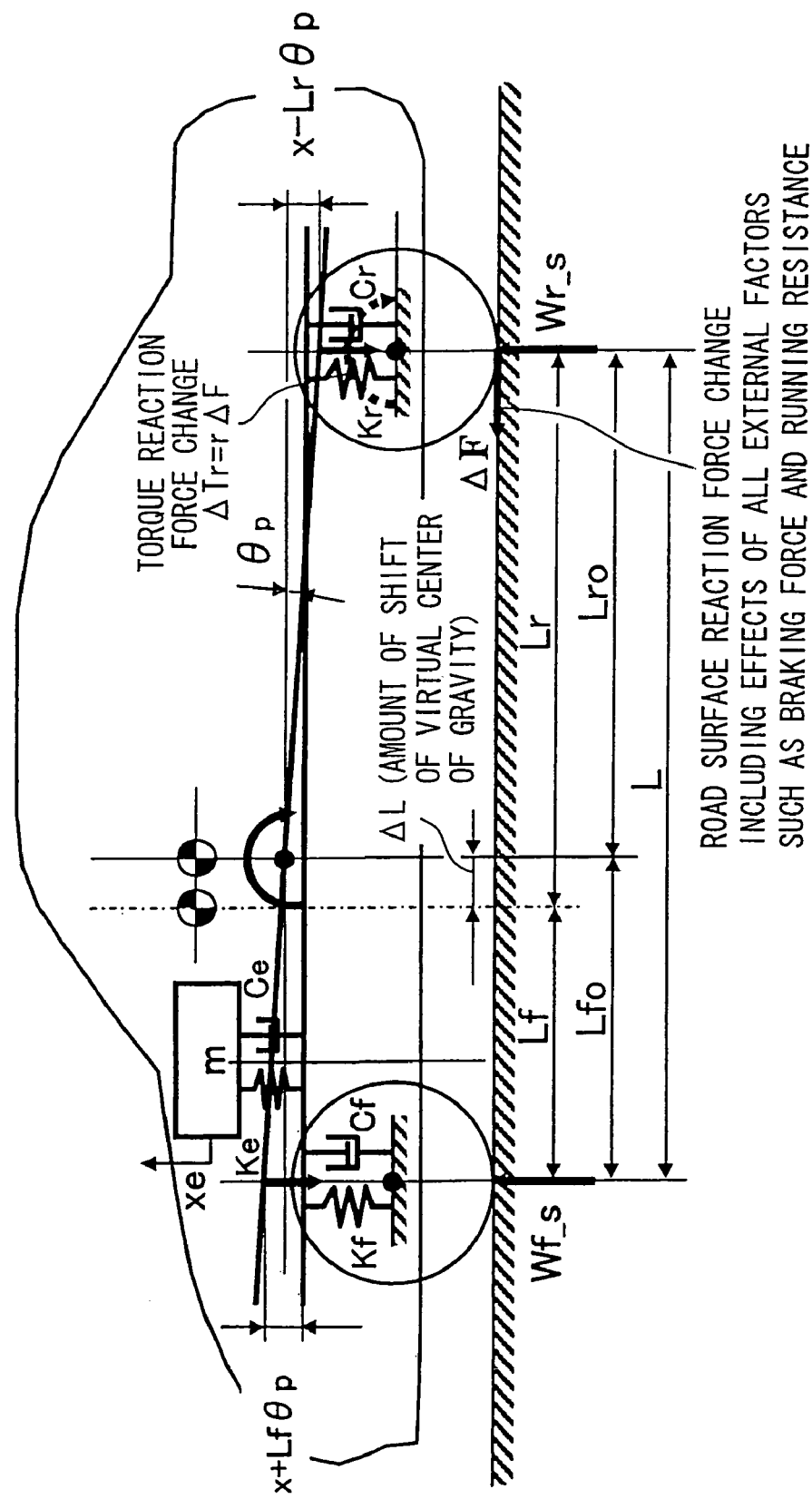
FIG. 3 is a schematic diagram of a vehicle oscillation model showing static loads of a front wheel and a rear wheel in a steady state.
Figure 15:
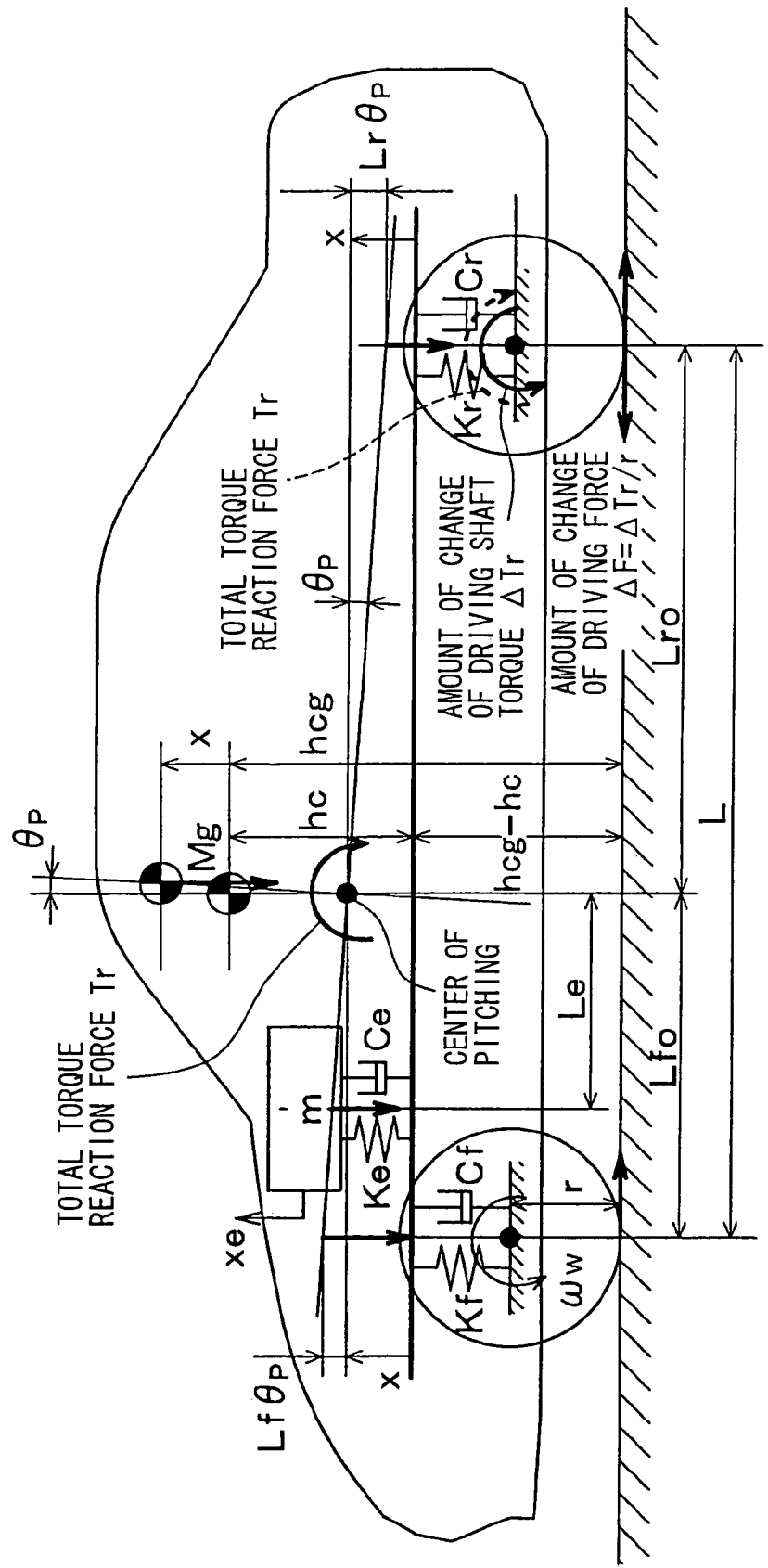
FIG. 15 is a schematic view of a sprung vehicle oscillation model.

The oscillation model in FIG. 3 shows a physical quantity in consideration of a virtual gravity center shift amount ΔL for the oscillation model shown in FIG. 15.

The static loads Wf_s and Wr_s respectively on the front wheel and the rear wheel in a steady state are expressed by Formulae 25 and 26. In these Formulae, however, Wfo and Wro indicate static loads on the front wheel and the rear wheel, and ΔWf_s and ΔWr_s are the amounts of change in static load on the front wheel and the rear wheel upon the action of a driving force change amount ΔF serving as a total road surface reaction force, which includes the effects of all external factors such as a braking force and the running resistance.

$$Wf\_s = Wfo + \Delta Wf\_s \qquad \text{(Formula 25)}$$

$$Wr\_s = Wro + \Delta Wr\_s \qquad \text{(Formula 26)}$$

Setting a distance between the center of gravity of the vehicle and the front wheel axis during its rest time to Lfo and a distance between the center of gravity of the vehicle and the rear wheel axis to Lro, the static loads Wfo and Wro on the front and rear wheels are expressed by Formulae 27 and 28. Herein, W is equivalent to a gravity Mg exerted on the vehicle weight M, that is, a total load on the front and rear wheels.

$$Wfo = (Lro/L)W \qquad \text{(Formula 27)}$$

$$Wro = (Lfo/L)W \qquad \text{(Formula 28)}$$

The static load change amounts ΔWf_s and ΔWr_s of the front and rear wheels are obtained by multiplying a spring constant kf or kr of the front or rear wheel by a vertical displacement of the vehicle body on the front wheel or rear wheel side x_s+Lfoθp_s or x_s−Lfoθp_s. Then, since the stationary solutions x_s and θp_s are expressed as Formula 24, the static load change amounts ΔWf_s and ΔWr_s of the front and rear wheels are expressed as Formulae 29 and 30, respectively.

$$\Delta Wf\_s = -kf(x\_s + Lfo\theta p\_s) \qquad \text{[Formula 29]}$$
$$= \frac{-kf\{(a1b5 - a5b1) - Lfo(a1b3 - a3b1)\}p1}{a1b3c5 + a3b5c1 + a5b1c3 - (a5b3c1 + a3b1c5 + a1b5c3)}\Delta Tr$$

$$\Delta Wr\_s = -kr(x\_s + Lro\theta p\_s) \qquad \text{[Formula 30]}$$
$$= \frac{-kr\{(a1b5 - a5b1) - Lro(a1b3 - a3b1)\}p1}{a1b3c5 + a3b5c1 + a5b1c3 - (a5b3c1 + a3b1c5 + a1b5c3)}\Delta Tr$$

Therefore, if the amount of change ΔTr is obtained from the estimated axle torque computed in the estimated axle torque calculating unit 2b in the front and rear wheel static ground load computing unit 2g so as to be assigned to Formulae 29 and 30, the front and rear wheel static load change amounts ΔWf_s and ΔWr_s are calculated. Then, Wfo, Wro, ΔWf_s, and ΔWr_s in Formulae 25 and 26 are expressed by Formulae 27 to 30, respectively. Therefore, if these values are assigned to Formulae 29 and 30, the static loads Wfo and Wro of the front and rear wheels can be obtained. In this manner, the static ground loads Wf_s and Wr_s on the front and rear wheels can be obtained.

Figure 4:
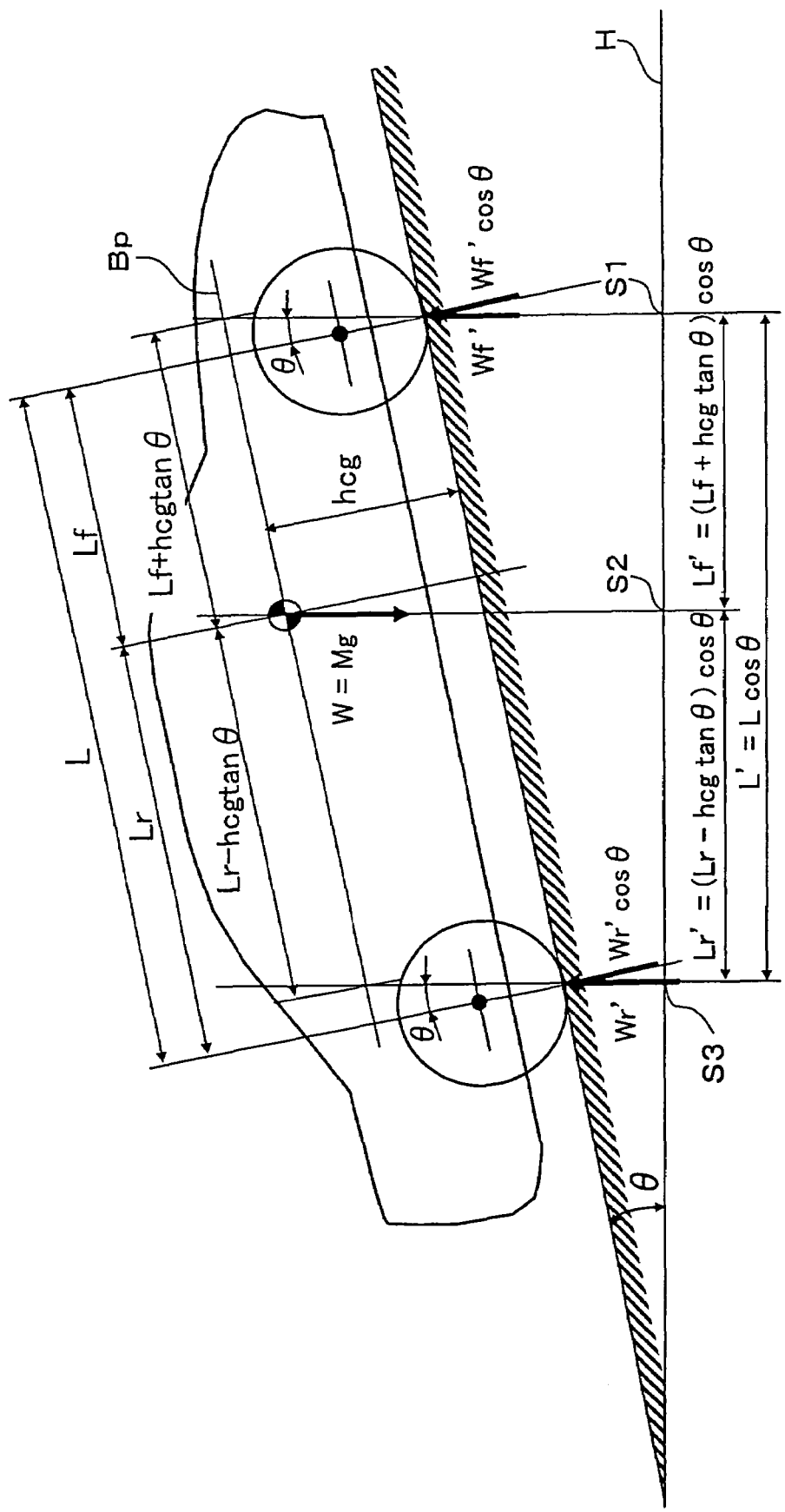
FIG. 4 is a schematic diagram of a vehicle model showing amounts of change in front and rear wheel ground loads due to road grade.

On the other hand, the amounts of change of the front and rear wheel ground loads due to road grade can be obtained based on a model shown in FIG. 4.

FIG. 4 shows the relation of physical quantities in the case where the vehicle is positioned at a predetermined road grade θ. As shown in this drawing, assuming that a height of the center of gravity of the vehicle from the road surface is a height of the center of gravity hcg and a vehicle body plane on which its center of gravity is positioned is Bp, distances from the intersecting points of lines extended from the positions of the front and rear wheels on which the loads are applied (the front and rear wheel ground positions) in a vertical direction and the vehicle body plane Bp to the center of gravity are respectively Lf+hcgtanθ and Lf−hcgtanθ.

Moreover, assuming that intersecting points of straight lines drawn in a vertical direction from the center of gravity of the vehicle and the front and rear wheel ground positions with respect to an arbitrary horizontal line H are S1, S2, and S3, respectively, a distance La between S1 and S3=Lcosθ, a distance Lf' between S1 and S2=(Lf+hcgtanθ)cos θ, and a distance Lr' between S2 and S3=(Lr−hcgtanθ)cos θ are obtained.

In this case, assuming that vertical ground loads applied on the front and rear wheels are Wf' and Wr', respectively, they can be expressed in the same manner as Formulae 27 and 28.

$$Wf' = (Lr'/L')W \qquad \text{[Formula 31]}$$
$$= \{(Lr - hcg\tan\theta)\cos\theta / (L\cos\theta)\}W$$
$$= \{(Lr/L - (hcg/L)\tan\theta)\}W$$
$$= Wfo - W(hcg/L)\tan\theta$$

$$Wr' = (Lr'/L')W \qquad \text{[Formula 32]}$$
$$= \{(Lf + hcg\tan\theta)\cos\theta / (L\cos\theta)\}W$$
$$= \{(Lf/L + (hcg/L)\tan\theta)\}W$$
$$= Wro + W(hcg/L)\tan\theta$$

Then, the ground loads on the front and rear wheels in a vertical direction to the road surface correspond to road surface vertical components to the vertical ground loads Wf' and Wr' to be Wf' cos θ and Wr' cos θ, respectively. Since the ground loads Wf' and Wr' in the vertical direction are expressed by Formulae 31 and 32, the followings are obtained.

$$Wf'\cos\theta = \{Wfo - W(hcg/L)\tan\theta\}\cos\theta \qquad \text{[Formula 33]}$$
$$= Wfo\cos\theta - W(hcg)\sin\theta$$

$$Wr'\cos\theta = \{Wro + W(hcg/L)\tan\theta\}\cos\theta \qquad \text{[Formula 34]}$$
$$= Wro\cos\theta + W(hcg)\sin\theta$$

In this manner, the amounts of change of the front and rear wheel ground loads due to the road grade can be obtained. The amounts of change of the front and rear wheel ground loads correspond to load quantities steadily changing while the vehicle is running on the road grade. Therefore, when the road grade is obtained by the road grade calculating unit 2d, the amounts of change of the front and rear wheel ground loads at the road grade are obtained. Then, the amounts of change of the front and rear wheel ground loads due to the road grade are subtracted from the static ground loads of the front wheel and the rear wheel, respectively, whereby the front and rear wheel ground loads can be obtained in accordance with the road grade.

Therefore, LfKcf−Lr Kcr obtained in the target value computing unit 2i described below is obtained as a stability factor of an ideal turning radius even in consideration of the road grade. As described above, the front and rear wheel ground loads can be obtained in the front and rear wheel static ground load computing unit 2g.

Moreover, the virtual turning radius estimating unit 2h estimates a virtual turning radius suitable for vehicle running based on the front wheel speed computed in front wheel speed computing unit 2d and information about a yaw angle (a sensor value) corresponding to the result of detection in the yaw rate sensor, which is sent from the navigation ECU 8. Specifically, if it is assumed the yaw angle (the sensor value) is γsensor [rad/s], a turning radius p is expressed as the following Formula from the yaw angle γsensor and a vehicle speed V.

$$\rho = V/\gamma sensor \qquad \text{(Formula 35)}$$

Therefore, the virtual turning radius estimating unit 2h obtains the vehicle speed V from the front wheel speed, for example, by obtaining an average value of the wheel velocities of both of the front wheels. The vehicle speed V and the yaw angle γsensor are assigned to Formula 35, thereby calculating a virtual turning radius.

The target value computing unit 2i determines a target value of LfKcf–LrKcr determining the stability factor. Hereinafter, the target value of LfKcf–LrKcr will be described.

In steady-state circular turning, a slip angle β and a yaw rate γ are defined as follows. They will be described with reference to FIG. 5.

Figure 5:
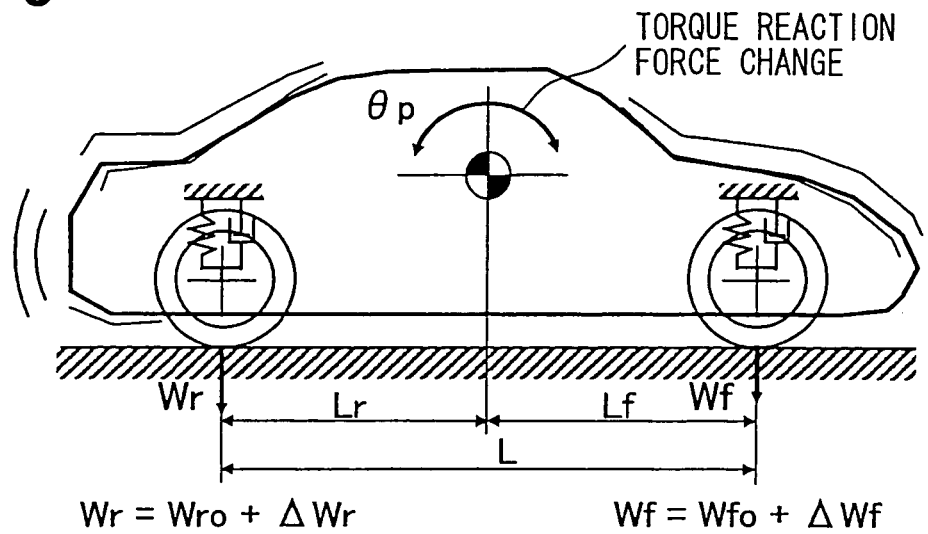
FIG. 5 is a schematic view of a vehicle force model showing the size of each part of a vehicle.

FIG. 5 schematically shows the size of each part of the vehicle and the like. As shown in this drawing, a sprung vehicle body mass [kg] is M, a wheel base [m] is L, a distance [m] between the center of gravity of the vehicle and the front wheel axis is Lf, and a distance [m] between the center of gravity of the vehicle and the rear wheel axis is Lr. Moreover, the vehicle speed is V [m/sec] and the rudder angle is δ [rad], and tire cornering powers of the front and rear wheels are Kcf and Kcr [N/rad], respectively. When the turning radius δ is expressed based on them, it is known that the following Formula is established.

$$\rho = \left(1 - \frac{M}{2L^2} \frac{LfKcf - LrKcr}{KcfKcr} V^2\right) \frac{L}{\delta} \qquad \text{[Formula 36]}$$
$$= (1 + AV^2)\frac{L}{\delta}$$

In this case, A in Formula 36 is the above-described stability factor, and is expressed by the following Formula to be determined for each vehicle.

$$A = -\frac{M}{2L^2} \frac{LfKcf - LrKcr}{KcfKcr} \qquad \text{[Formula 37]}$$

The steering characteristic is determined depending on the stability factor in Formula 37, specifically, whether the term LfKcf–LrKcr in the stability factor is negative or positive. The steering characteristic is expressed as follows.

Δ=LfKcf–LrKcr<0→∂ρ/∂V>0 (understeer)

Δ=LfKcf–LrKcr=0→∂ρ/∂V=0 (normal turn)

Δ=LfKcf–LrKcr>0→∂ρ/∂V<0 (oversteer) [Formula 38]

Figure 6A:
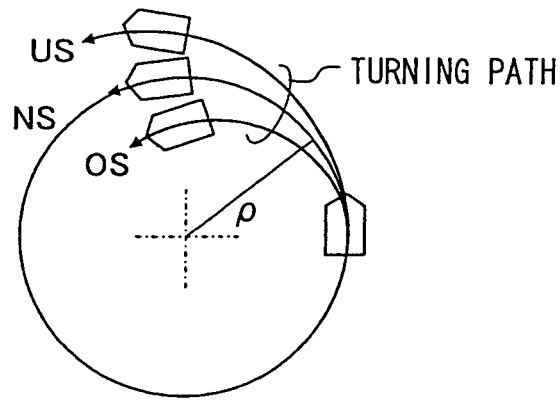
FIG. 6A is a plan view of a vehicle turning path.
Figure 6B:
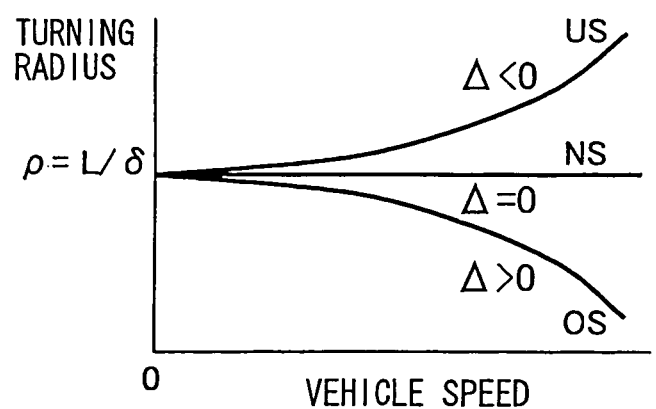
FIG. 6B is a graph showing a relationship between a vehicle speed and a turning radius.

Specifically, assuming that the term LfKcf–LrLKcr is Δ, it is considered that a circular turn is a steady turn (an ideal turn) as shown in FIG. 6A showing a vehicle turning state. Then, if Δ is negative, a steering characteristic is understeer; if it is 0, it is a steady turn; and if Δ is positive, it is oversteer. In other words, as shown in a correlation diagram between the vehicle speed and the turning radius shown in FIG. 6B, if Δ is negative, the turning radius becomes large with respect to the vehicle speed (understeer); if it is 0, a steady turn is performed; and if Δ is positive, the turning radius becomes small with respect to the vehicle speed (oversteer).

Therefore, the vehicle can make an ideal turn depending on how the term LfKcf–LrKcr in the stability factor is set, thereby improving the steering characteristic.

Accordingly, the target value computing unit 2i makes a back calculation from Formula 36 to compute the target value of LfKcf–LrKcr. Specifically, LfKcf–LrKcr can be obtained from the following Formula.

$$LfKcf - LrKcr = Kcf\_sKcr\_s(2L^2/MV^2)^*(1-\rho\delta/L) \qquad \text{(Formula 39)}$$

where Kcf_s and Kcr_s are static cornering powers of the front and rear wheels in consideration of only a shift of the load due to the road grade and acceleration and deceleration, δ is a steering angle, and ρ is a virtual turning radius.

Among them, the vehicle speed V, the steering angle δ and the virtual turning radius ρ are independent variables. The vehicle speed obtained by the above-described method from the front wheel speed computed in the front wheel speed calculating unit 2c is used as the vehicle speed V, and the result of computation in the steering angle calculating unit 2e is used as the steering angle. As the virtual turning radius, the one obtained from Formula 35 is used. In this manner, the target value of LfKcf–LrKcr is obtained in the target value computing unit 2i.

Then, the vibration damping correction controlling unit 2j obtains the amount of change from the target value of the stability factor from a difference with the actual LfKcf–LrKcr in the case where the target value of LfKcf–LrKcr is a computed value based on the target value of LfKcf–LfKcr obtained in the target value computing unit 2i. The vibration damping correction controlling unit 2j corrects the basic request torque obtained in the basic request torque calculating unit 2a so as to eliminate the change.

Specifically, as shown in FIG. 2, the output y obtained from the pitching oscillation model for the target value is reduced to obtain a difference between the target value of the stability factor and the current actual stability factor. The difference value is multiplied by 1/s and Ki. This is because the feedback of a servo system can be performed by obtaining the target value as integral. Therefore, even if the target value is not 0, the target value is followed by the value. Then, the running resistance disturbance is further added to the value. A value obtained by multiplying each of the state quantities x (x, x', xe, xe', θp, and θp') computed by using the pitching oscillation model by a predetermined state feedback gain Ks (K1 to K6) obtained by a designing technique of a control system is subtracted from the result of addition, thereby obtaining a correction value of the driving torque.

Herein, setting a load dependence coefficient to Cw, Δ (=LfKcf–LrKcr) can be expressed as follows because the tire cornering powers Kcf and Kcr of the front wheel and the rear wheel depend on the front and rear wheel ground loads Wf and Wr.

$$\Delta = LfKcf - LrKcr \qquad \text{(Formula 40)}$$
$$= Cw(LfWf - LrWr)$$

As a result, a fluctuation in Δ (=LfKcf−LrKcr) with fluctuations in the cornering powers Wf and Wr of the front wheel and the rear wheel, that is, a fluctuation in steering characteristic can be expressed by the following Formula from Formulae 25, 26, and 40.

$$LfKcf - LrKcr = Cw(LfWf - FrWr) \quad \text{(Formula 41)}$$
$$= CwLf(Wfo + \Delta Wf) -$$
$$CwLr(Wro + \Delta Wr)$$
$$= -Cw(KfLf - KrLr)x -$$
$$Cw(CfLf - CrLr)x' -$$
$$Cw(KfLf^2 + KrLr^2)\theta p -$$
$$Cw(CfLf^2 - CrLr^2)\theta p'$$

Therefore, Δ (=LfKcf−LrKcr), which serves as a governing parameter of the steering characteristic, can be expressed by a linear combination of the state quantities as Formula 42 based on Formulae 11 to 16. When Formula 41 is expressed as a sextic determinant, Formula 43 is established.

$$LfKcf - LrKcr = q1 \times 3 + q2 \times 4 + q3 \times 5 + q4 \times 6 \quad \text{(Formula 42)}$$

$$q1x3 + q2x4 + q3x5 + q4x6 = \underbrace{[0 \ 0 \ q1 \ q2 \ q3 \ q4]}_{=C} \begin{bmatrix} x1 \\ x2 \\ x3 \\ x4 \\ x5 \\ x6 \end{bmatrix} \quad \text{[Formula 43]}$$

where q1 to q4 are factors, which are respectively q1=−Cw (KfLf−KrLr), q2=−Cw (CfLf−CrLr), q3=−Cw (KfLf²+KrLr²), q4=−Cw (CfLf²−CrLr²).

This is an output equation shown in FIG. 2. When Formula 42 is simplified, an output equation of the sprung oscillation model as y=Cx+Du (since D=0, substantially y=Cx) is derived.

Therefore, by assigning the respective state quantities x, x', Xe, Xe', θp, and θp' to the output equation, a difference between the target value and the actual stability factor is computed. Based on the difference, feedback control is performed. In this manner, target track control by servo system status feedback can be performed.

The thus obtained axle torque is corrected in view of the estimated running resistance disturbance and the state quantity x so as to follow the target value of LfKcf−LrKcr. Since the correction value of the axle torque is an absolute value, the correction value is subtracted from the result of computation in the estimated axle torque calculating unit 2b to obtain a relative value of the axle torque. Specifically, if the correction value of the axle torque is obtained by using the pitching oscillation model, the corrected axle torque computed from the target value may not be accurate depending on the accuracy of the pitching oscillation model. Therefore, in order to obtain a steady-state deviation of 0, a difference between an estimated axle torque, which is supposed to be currently generated at in practice, and the correction value of the axle torque is obtained to relatively adjust the correction value.

Then, after the relatively adjusted correction value is multiplied by a reduction ratio in the final reduction gear (a differential ratio: 1/Rd), the obtained value is subtracted from the basic request torque computed in the basic request torque calculating unit 2a. As a result, the correction value of the axle toque is obtained as an absolute value for the basic request torque, which serves as a corrected request torque.

In this manner, the axle torque to be generated in the engine 1 is determined. The amount of intake air or the amount of fuel injection of the engine 1 is adjusted so as to obtain the corrected request torque to output an energy in accordance with it. Then, the energy is transmitted through the transmission (T/M) 12, the final reduction gear 13 and the like to the driving wheels 15a and 15b as rotational energy. The driving wheels 15a and 15b generate an axle torque in response to the request.

As described above, according to the vehicle stability control system described in this embodiment, the axle torque is corrected in view of the estimated running resistance disturbance and the state quantity x so as to follow the target value of LfKcf−LrKcr serving as the stability factor. Therefore, the stability factor can be stabilized for providing an ideal turning radius for each occasion in response to various surrounding environments that momentarily change. Each internal state quantity is stabilized, for example, the pitching oscillation energy is restrained so as to allow the running state of the vehicle to be stabilized.

Figure 7:
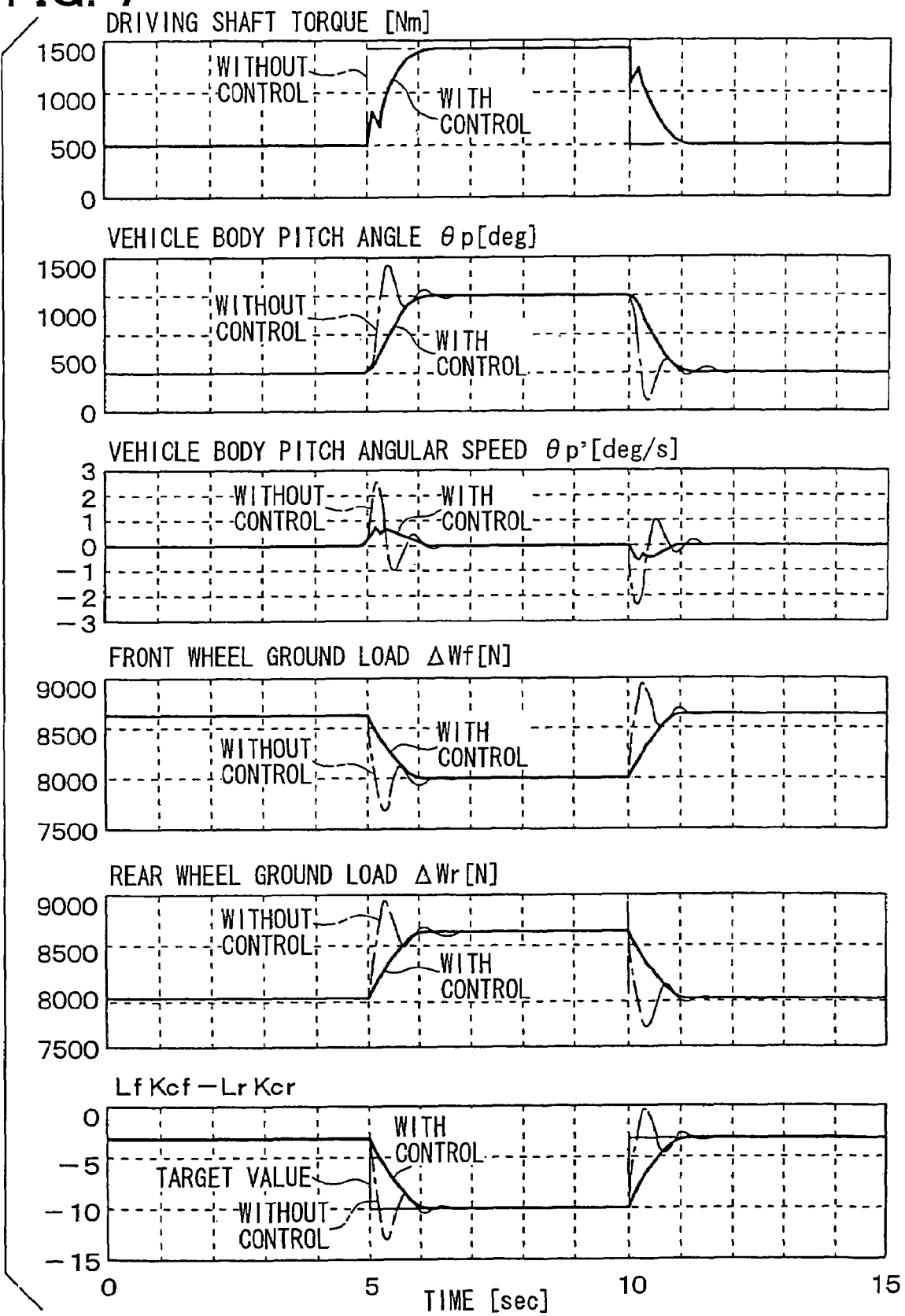
FIG. 7 provides multiple graphs showing results of simulations for a plurality of vehicle states caused by a change in driving shaft torque and a stability factor.

As reference, FIG. 7 shows the results of simulations for each state quantity and a change in stability factor for a change in driving shaft torque. As shown in this drawing, if control according to this embodiment is performed, the magnitude of fluctuation of the state quantity is small so that the stabilization is achieved in the early period as compared with the case where the control is not performed.

As described above, the fluctuation in the behavior of the vehicle body can be restrained from disturbing the attitude of the vehicle body or the running path due to the road surface or other external factors (road surface disturbance). Since the vehicle body attitude disturbance or the oscillation due to them can be restrained, a steering operation by a driver for correcting the disturbance of the attitude of the vehicle body or the oscillation is not required. Therefore, disturbance components can be prevented from being induced by the steering operation by the driver.

Thus, since the effects of the driver operation disturbance or the road surface disturbance can be suppressed, the vehicle body attitude or the vehicle characteristics can be stabilized. Therefore, the driving burden on the driver can be reduced.

Conventionally, in Japanese Patent Laid-Open Publication No. Hei 5-26067, a driving wheel controlling device for obtaining a yaw rate in a vehicle, detecting whether the vehicle is in an oversteer state or an understeer state from the yaw rate, and controlling an engine output so as to prevent it has been proposed. Even in the device in this patent publication, the vehicle can be restrained from getting into the oversteer state or the understeer state by adjusting the engine output. However, the yaw rate serves to detect a rotational component with a vertical axis of the vehicle as its axis but not for detecting a pitching oscillation component corresponding to the rotation about the center of gravity of the vehicle with a horizontal axis of the vehicle as its axis. Therefore, even if the engine output is corrected based on the yaw rate, the correction is not performed in such a way that the pitching oscillation component can be suppressed. Therefore, the effects of stabilizing a fluctuation in front and rear wheel loads so as to allow the stabilization of the cornering power by suppressing the pitching oscillation component as described in this embodiment cannot be obtained.

A second embodiment of the present invention will now be described. In this embodiment, the computation for estimation of the virtual turning radius is executed based on image data in the vehicle stability control system shown in the first embodiment. Since the other parts of the vehicle stability control system in this embodiment are the same as those of the first embodiment, only different parts will be described and the description of the same parts is omitted herein.

Figure 8:
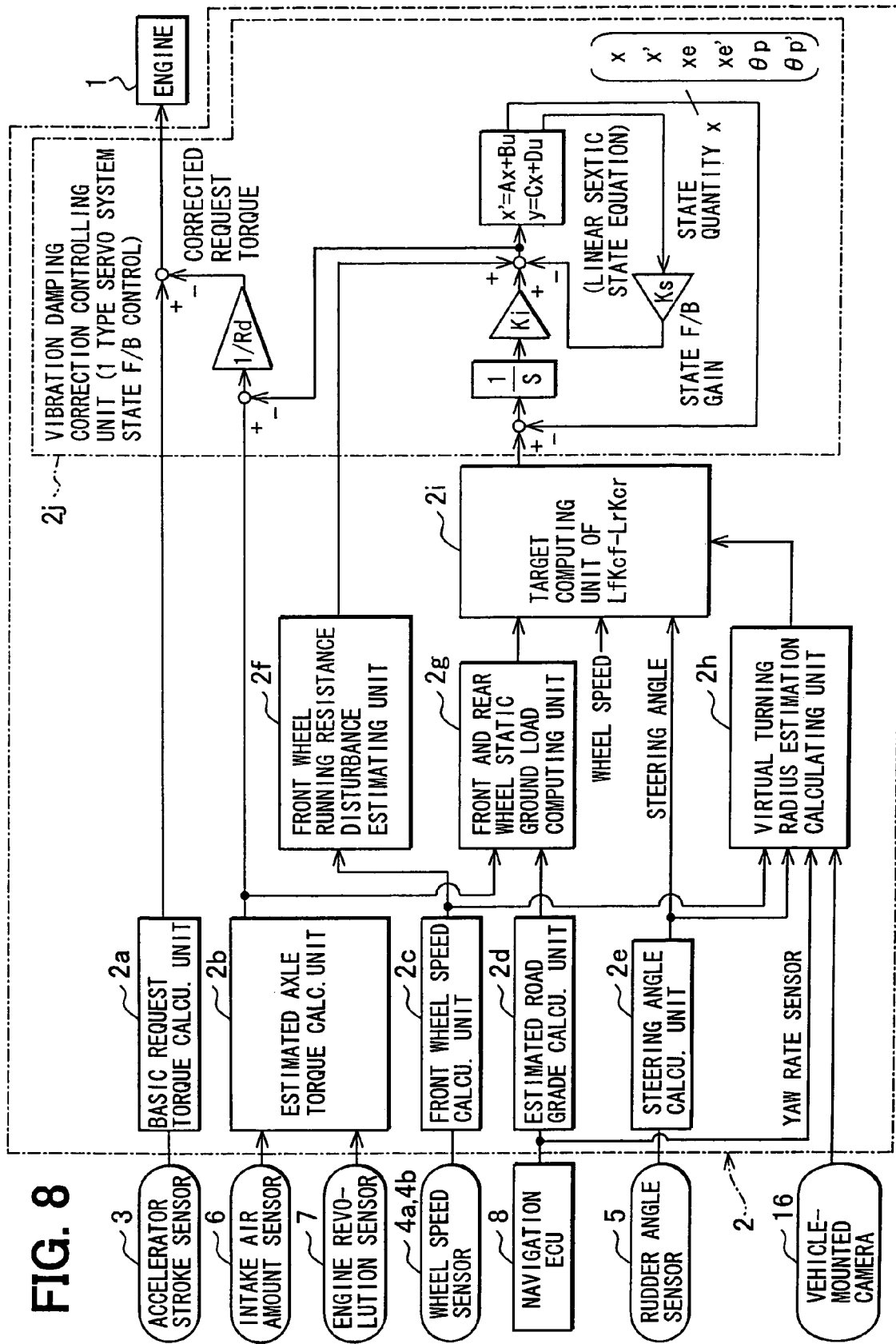
FIG. 8 is a block diagram of an engine electronic control unit of a second embodiment of the vehicle stability control system according to the present invention.

FIG. 8 shows the overall configuration of the vehicle stability control system of this embodiment. As shown in this drawing, the vehicle stability control system of this embodiment is equivalent to the configuration of the first embodiment to which a vehicle-mounted camera 16 is added.

The vehicle-mounted camera 16 displays ahead of the vehicle. It constantly shoots the images ahead of the vehicle while the vehicle is running, and transmits the image data to an ECU for vehicle state detection.

The image data in the vehicle-mounted camera 16 is to be input to the engine ECU 2. The engine ECU 2 detects a running state of the vehicle based on the image data of the vehicle-mounted camera 16 and the detection signals from the steering angle sensor and the yaw rate sensor.

Specifically, the engine ECU 2 obtains an angle of rotation of the vehicle, that is, the amount of rotation with respect to a center axis of the vehicle, and the amount of movement by the translational motion of the vehicle as parameters indicating a running state of the vehicle.

More specifically, the inventors of the present invention have found that an optical flow of the image data displayed by the vehicle-mounted camera 16 includes a physical quantity indicating the running state of the own vehicle. Physical meaning of the optical flow will be described.

Figure 9A:
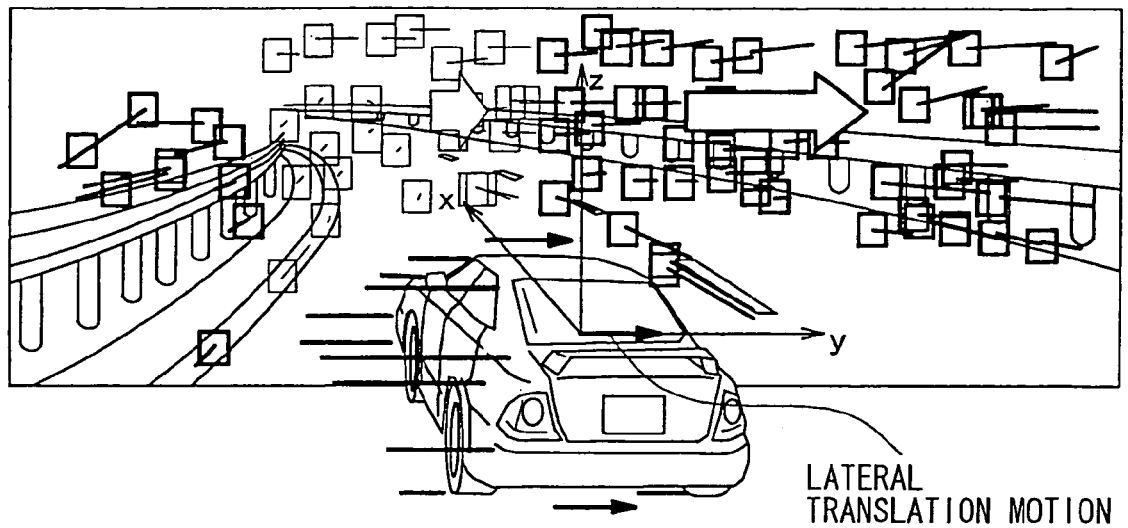
FIG. 9A is a rear view of an optical flow when a vehicle undergoes only a lateral translation.
Figure 9B:
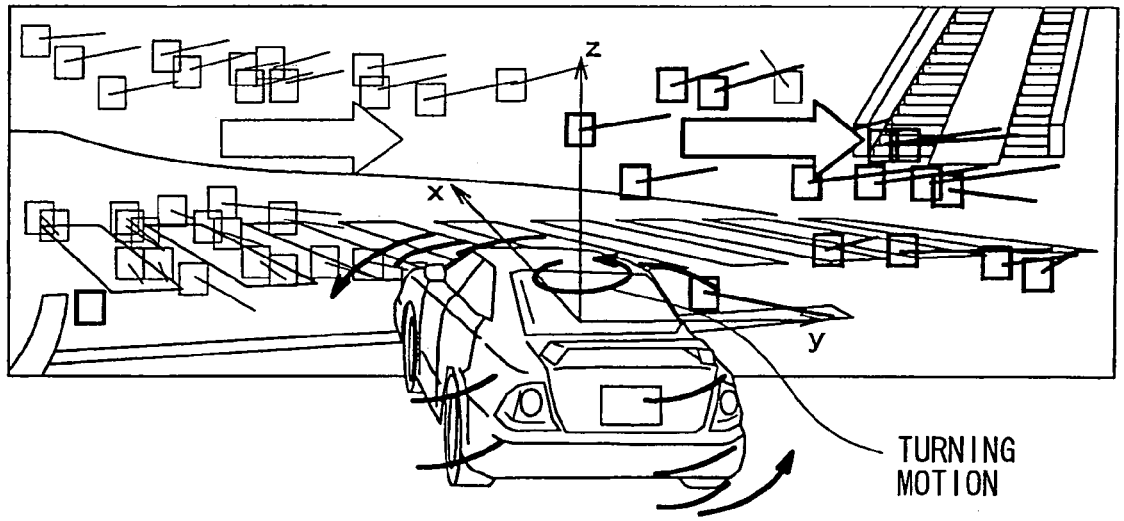
FIG. 9B is a rear view of an optical flow when a vehicle undergoes only a turning motion.

FIG. 9A shows an optical flow in the case where the vehicle performs only a translational motion in a lateral direction, and FIG. 9B shows an optical flow in the case where the vehicle performs only a turning motion. In these drawings, a longitudinal direction of the vehicle is indicated as an X-axis, a horizontal direction is as a Y-axis, and a vertical direction is as a Z-axis. The translational motion of the vehicle in the lateral direction means that the vehicle moves on the Y-axis, and the turning motion of the vehicle means that the vehicle turns about the Z-axis as the center.

The optical flow indicates a horizontal travel speed at an arbitrary point of regard in front, viewed from the vehicle-mounted camera 16, and corresponds to a vector connecting two points in the case where an arbitrary point of regard in image coordinates shifts to a certain point after predetermined time.

As shown in FIG. 9A, if the vehicle performs a translational motion in the lateral direction, the optical flow is small at a position far from the vehicle in front of the vehicle in the image data, whereas the optical flow becomes large on the right or left of the vehicle. On the other hand, if the vehicle turns as shown in FIG. 9B, the optical flow becomes large either at the position in front of the vehicle or on the right or left in the image data.

This shows that the optical flows differ from each other in the case where the vehicle performs a translational motion in the lateral direction and in the case where it performs a turning motion. Therefore, if the optical flow contained in image data is analyzed in the case where images are taken by the vehicle-mounted camera 16, it is believed that the translational motion or the turning motion of the vehicle can be detected.

Figure 10:
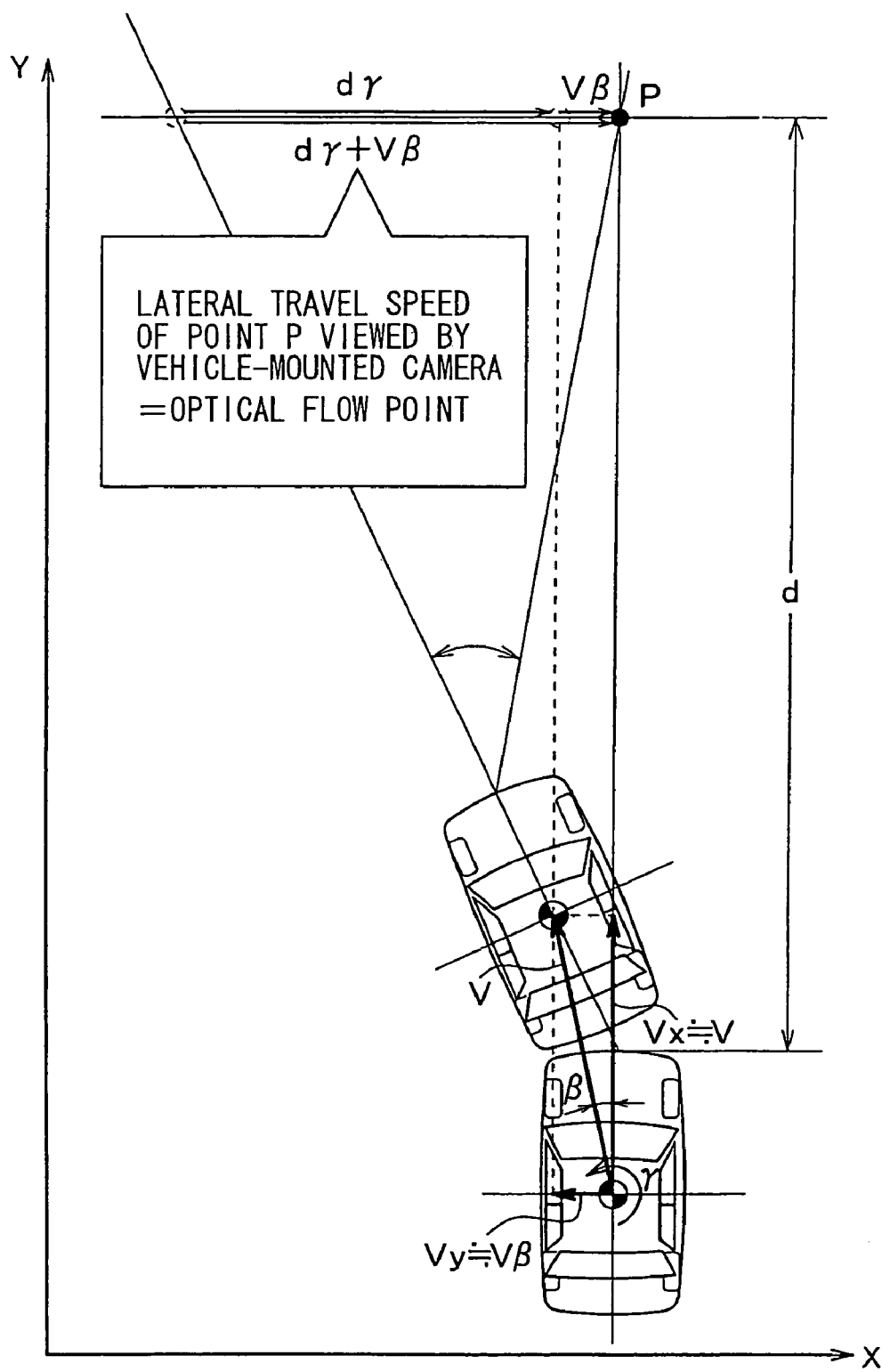
FIG. 10 is a plan view illustrating how a point of regard shifts in accordance with vehicle movement after a predetermined period of time.

FIG. 10 is a view, in which a position at a distance of d among the central positions ahead of the vehicle is set as a point of regard P, for showing how the point of regard shifts with the movement of the vehicle after predetermined time.

As shown in this drawing, when the vehicle travels with a slip angle β and a yaw rate γ, the point of regard P shifts in the lateral direction of the vehicle at the speed of d·γ+Vβ. Therefore, setting the lateral speed of the optical flow obtained from the image data to Vy_flow, this is expressed by the following Formula.

$$d·γ+Vβ=Vy\_flow \quad \text{(Formula 44)}$$

This Formula means that the sum of a lateral travel speed Vβ due to side slipping of the vehicle and a lateral travel speed d·γ of the point of regard in front due to the angular speed around the center of gravity appears as a lateral component of the optical flow of the point of regard P in front, which is captured in the image. In other words, the lateral speed component of the optical flow indicates the constraint relation between the side slipping motion and the turning motion of the vehicle.

On the other hand, in steady-state circular turning, the slip angle β and the yaw rate γ are defined as follows. They will be described with reference to FIG. 5 described above.

It is assumed that the size of each part of the vehicle and the like has the relation shown in FIG. 5, that is, the vehicle body mass [kg] is M, the wheel base [m] is L, the distance [m] between the center of gravity of the vehicle and the front wheel axis is Lf, and the distance [m] between the center of gravity of the vehicle and the rear wheel axis is Lr. Moreover, it is assumed that the vehicle speed is V [m/sec], the rudder angle is δ [rad], and the tire cornering powers of the front and rear wheels are Kf and Kr [N/rad], respectively. Then, if the turning radius ρ is expressed based on them, it is known that the above-described Formula 36 is established.

Since the turning radius ρ can be expressed as Formula 35 from the vehicle speed V and the yaw rate γ, it is found that the yaw rate γ can be expressed as Formula 45 from Formula 35 and the above Formula 36.

$$γ = \frac{1}{1+AV^2} \frac{V}{L} δ \quad \text{[Formula 45]}$$

In the same manner, the slip angle β in steady-state circular turning is expressed as the following Formula.

$$β = \frac{1-KV^2}{1+AV^2} \frac{Lr}{L} δ \quad \text{[Formula 46]}$$

In Formula 46, K is defined as the following Formula.

$$K = \frac{M}{2L} \frac{Lf}{LrKcr} \quad \text{[Formula 47]}$$

Therefore, from the relation between Formula 45 and Formula 46, Formula 48 is derived. The lateral travel speed d·γ of the point of regard in front by the rotational angular speed and the lateral travel speed Vβ due to sideways slipping are in proportional relation; the lateral traveling speed Vβ increases with a predetermined gradient α with respect to the lateral travel speed d·γ. Therefore, Formula 48 is also expressed as a formula in which the lateral travel speed Vβ increases with the gradient α to the lateral travel speed d·γ.

$$V\beta = (1 - KV^2)Lr\gamma \quad \text{(Formula 48)}$$
$$= \alpha \cdot d \cdot \gamma \text{ where}$$
$$\alpha = (1 - KV^2)Lr/d$$

From Formula 48 and the above Formula 44, the lateral travel speed $V\beta$ due to side slipping of the vehicle in the constraint state and the lateral travel speed $d \cdot \gamma$ of the point of regard in front by the rotation angular speed about the center of gravity are expressed as Formulae 49 and 50.

$$d \cdot \gamma = \left[\frac{1}{1+\alpha}\right]V_{y\_flow} \quad \text{[Formula 49]}$$

$$V\beta = \left[\frac{\alpha}{1+\alpha}\right]V_{y\_flow} \quad \text{[Formula 50]}$$

Therefore, if the yaw rate $\gamma$ is derived from the optical flow $V_{y\_flow}$ based on Formula 49, the virtual turning radius $\rho$ can be obtained based on the derived yaw rate $\gamma$ using Formula 35. As a result, the virtual turning radius $\rho$ in the first embodiment can be computed. By using the virtual turning radius $\rho$, the correction value of the axle torque can be obtained in the same manner as in the first embodiment to obtain the corrected request torque.

The image data in the images taken by the vehicle-mounted camera 16 sometimes contains data of an oncoming vehicle or people nearby. In such a case, instead of simply obtaining the virtual turning radius $\rho$ by the same technique as in the first embodiment, the virtual turning radius $\rho$ can also be obtained in accordance with an oncoming vehicle or people nearby.

Figure 11A:
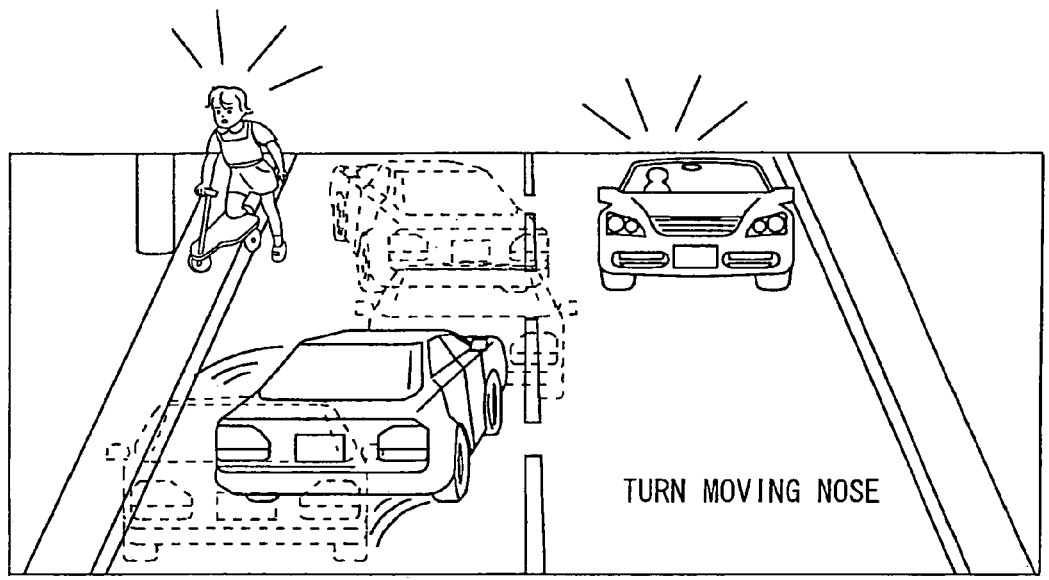
FIG. 11A is a rear view of a traveling path on which the vehicle runs in accordance with image data of a vehicle-mounted camera.
Figure 11B:
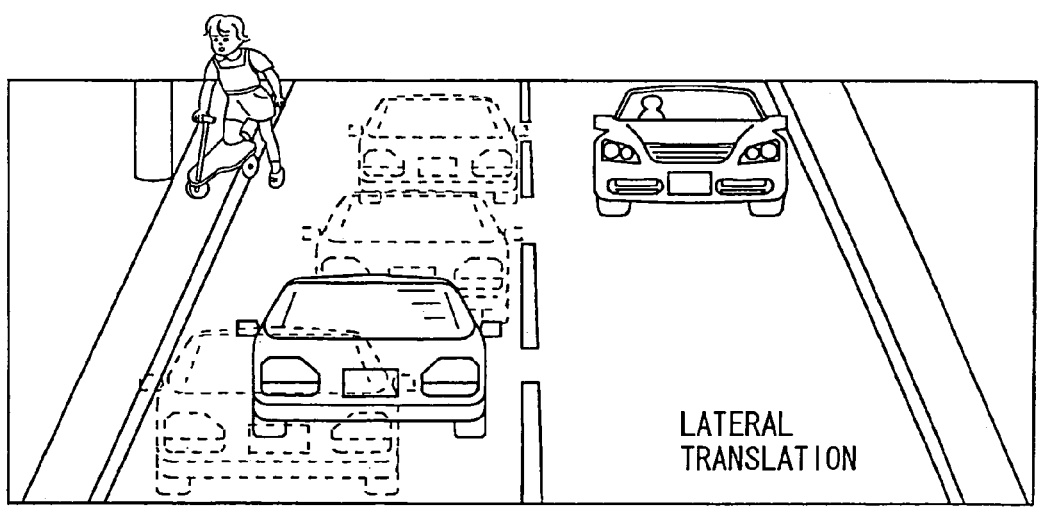
FIG. 11B is a rear view of an alternative traveling path on which the vehicle runs in accordance with image data of a vehicle-mounted camera.

For example, the case as shown in FIG. 11 is assumed. As shown in this FIG. 11A, if the own vehicle is shifted toward the center line so as to avoid a person ahead of the own vehicle on the left with the presence of an oncoming vehicle, there is a possibility that a driver of the oncoming vehicle may be intimidated even if the own vehicle does not stray onto the opposite lane. Therefore, in such a case, if the own vehicle avoids the person without swerving when viewed from the oncoming vehicle, that is, the own vehicle moves as if it laterally slid as shown in FIG. 11B, the own vehicle does not seem to stray onto the opposite lane, thereby less intimidating the driver of the oncoming vehicle.

Therefore, in the case where the oncoming vehicle is present in the image data and the oncoming vehicle is distant from the own vehicle by a predetermined distance or more, it is preferred that the virtual turning radius is set such that priority is given to the lateral translational motion rather than to the turning motion. On the contrary, if it is close to be within the predetermined distance, it is preferred that the virtual turning radius is set such that priority is given to the turning motion rather than to the lateral translational motion so as to more safely avoid the oncoming vehicle or the person.

The preferred setting as the virtual turning radius differ between in high-speed running and in low-speed running. Specifically, in high-speed running, the driver has different impressions in the case where the vehicle turns to change the lane by moving its nose and in the case where the vehicle laterally slides to change the lane. In this case, the driver has much more feeling of safety in the case where the vehicle changes the lane as if it laterally slid.

On the other hand, in low-speed running, the driver has the impression that the vehicle is easy to turn in the case where the vehicle turns sharply.

It is preferred to set the virtual turning radius by the following technique so as to set the virtual turning radius in consideration of the above viewpoints.

First, since $\alpha$ is a value derived from a geometric relation in steady-state turning in Formulae 49 and 50, the relation in Formula 48 is substituted as follows so as to extend it to an arbitrary state.

$$V\beta = \alpha' \cdot d \cdot \gamma \quad \text{(Formula 51)}$$
$$= k\alpha \cdot d \cdot \gamma$$

where $\alpha' = k\alpha$, and k is an adjustment gain constant.

The lateral travel speed $V\beta$ due to side slipping of the vehicle in an arbitrary running condition and the lateral travel speed $d \cdot \gamma$ of the point of regard in front due to rotational angular speed about the center of gravity are expressed based on Formula 51 and Formula 44 described above as Formulae 52 and 53.

$$d \cdot \gamma = \left[\frac{1}{1+k\alpha_0}\right]V_{y\_flow} \quad \text{[Formula 52]}$$

$$V\beta = \left[\frac{k\alpha_0}{1+k\alpha_0}\right]V_{y\_flow} \quad \text{[Formula 53]}$$

Moreover, Formula 52 shows that the yaw rate $\gamma$ is expressed by Formula 54, whereas Formula 53 shows the slip angle $\beta$ is expressed as Formula 55.

$$\gamma = \frac{1}{d}\left[\frac{1}{1+\alpha}\right]V_{y\_flow} \quad \text{[Formula 54]}$$

$$\beta = \frac{1}{V}\left[\frac{\alpha}{1+\alpha}\right]V_{y\_flow} \quad \text{[Formula 55]}$$

From these Formulae, if $k>1$ ($\alpha'>\alpha$), (the lateral travel speed $V\beta$ due to side slipping)>(the lateral travel speed $d \cdot \gamma$ of the point of regard in front by the rotational angular speed). Therefore, the control mode is such that priority is given to the lateral translational motion. If $k=1$ ($\alpha'=\alpha$), (the lateral travel speed $V\beta$ due to side slipping)=(the lateral travel speed $d \cdot \gamma$ of the point of regard in front by the rotational angular speed). Therefore, the control mode is such that the turning radius in a steady state is set. If $k<1$ ($\alpha'<\alpha$), (the lateral travel speed $V\beta$ due to side slipping)<(the lateral travel speed $d \cdot \gamma$ of the point of regard in front by the rotational angular speed). Therefore, the control mode is such that priority is given to the turning motion.

Therefore, if the value of k is adjusted based on the contents contained in the image data, it is possible to appropriately select one from the control mode for giving priority to the lateral translational motion, the steady-state turning, or the control mode for giving priority to the turning motion.

Therefore, k is defined as a function of the vehicle speed V and the steering angle $\delta\{k=f(V, \delta)\}$. The function is set so that priority is given to the lateral translational motion as the vehicle speed increases or the steering angle decreases and priority is given to the lateral translational motion as the vehicle speed decreases or the steering angle increases.

As a result, in the case where an oncoming vehicle, a person or the like is present in the image data, it is possible to freely operate the constraint relation between the lateral translational motion and the turning motion in accordance with the running state of the own vehicle and a distance from an obstacle ahead and the like. Therefore, an oncoming vehicle or a person can be less intimidated.

Figure 12:
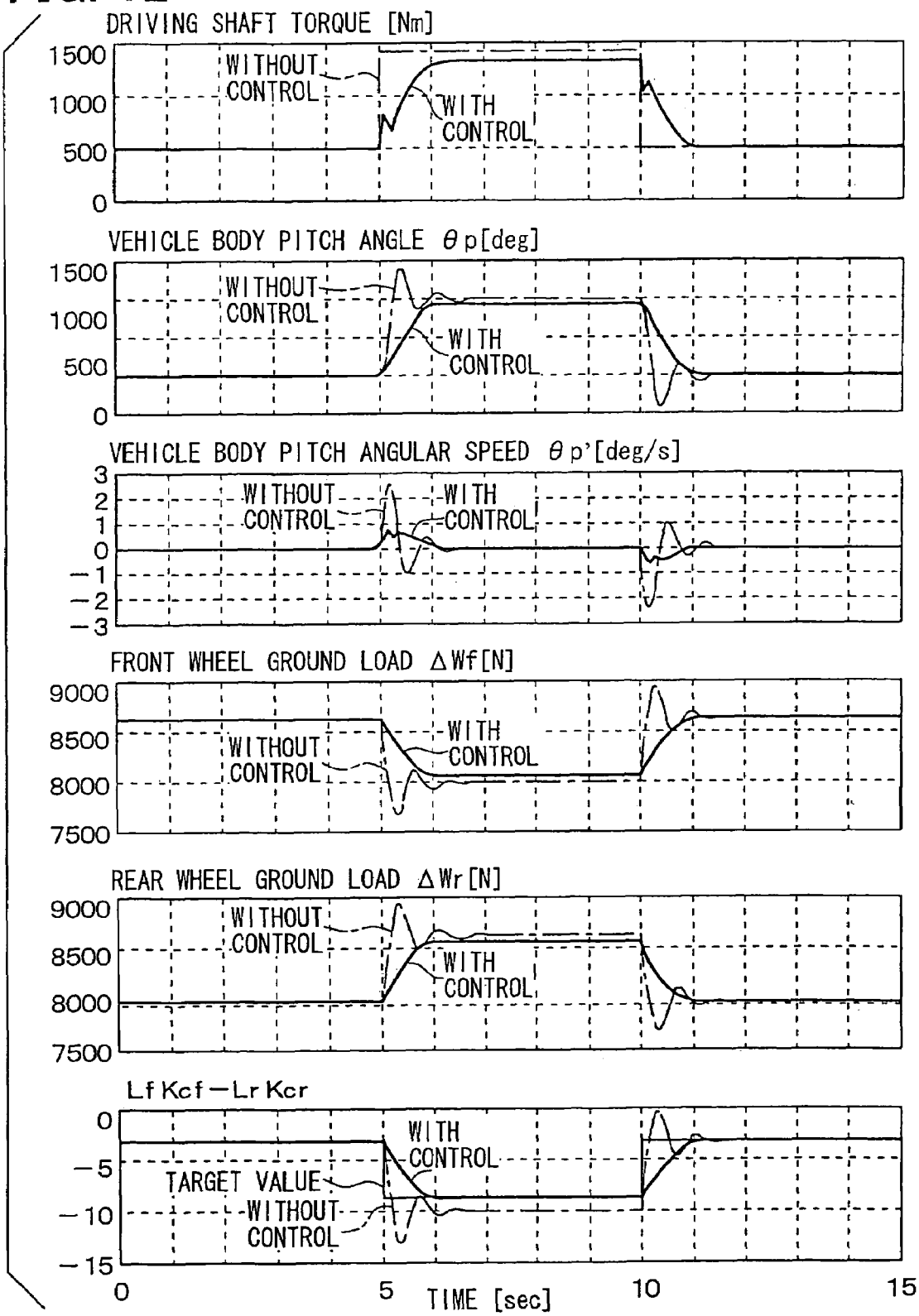
FIG. 12 provides multiple graphs showing results of simulations for a plurality of vehicle states caused by a change in driving shaft torque and a stability factor.
Figure 13A:
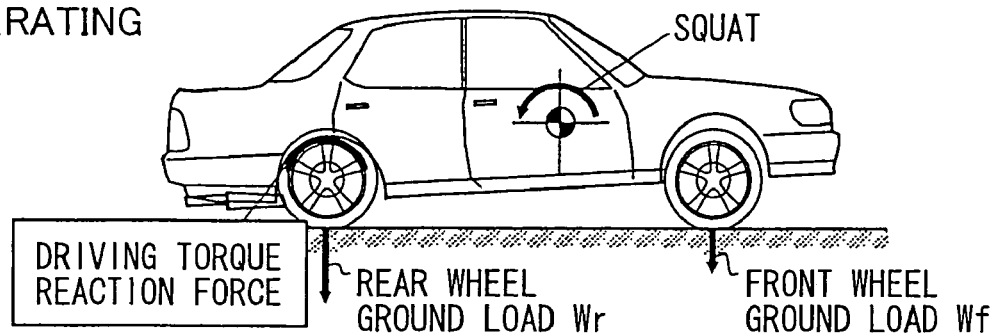
FIG. 13A is a side view of a vehicle accelerating.
Figure 13B:
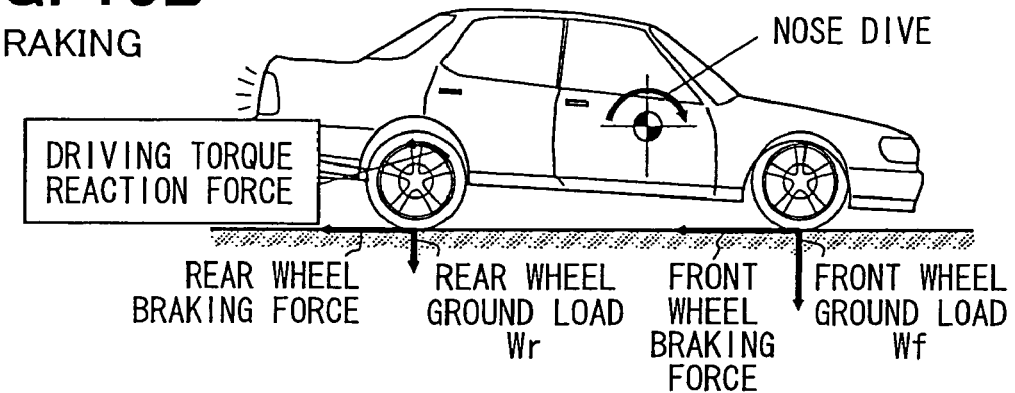
FIG. 13B is a side view of a vehicle braking.
Figure 13C:
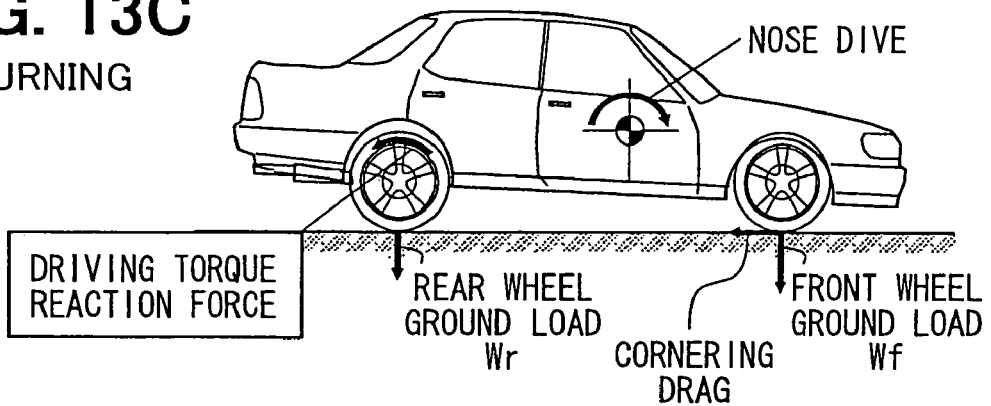
FIG. 13C is a side view of a vehicle turning.
Figure 14A:
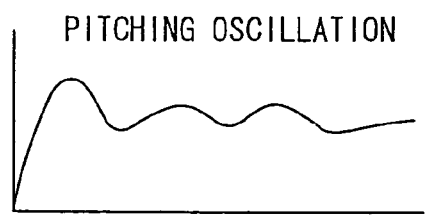
FIG. 14A is a timing chart of pitching oscillation.
Figure 14B:
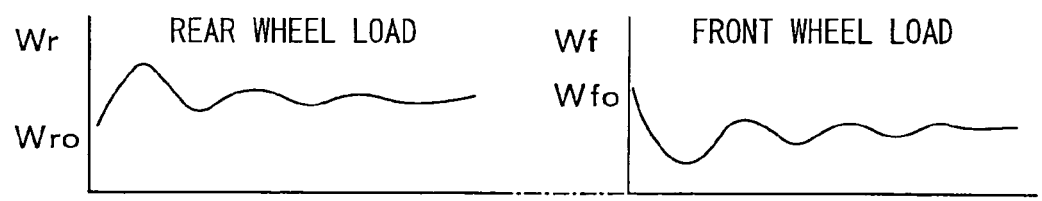
FIG. 14B provides timing charts showing a relationship between front and rear wheel ground loads.
Figure 14C:
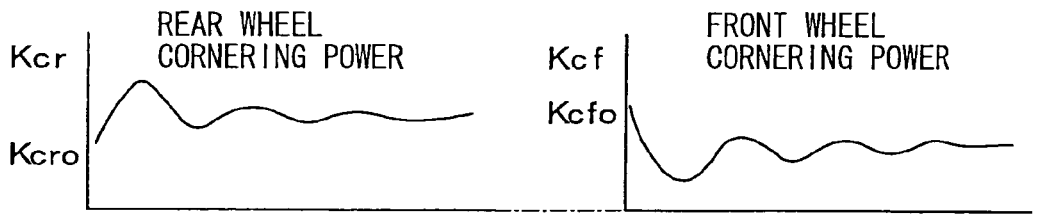
FIG. 14C provides timing charts showing a relationship between front and rear wheel cornering powers.

In the case where such control is performed, a timing chart of each state quantity in the control is obtained by simulations as shown in FIG. 12. As shown in this drawing, if the target turning radius is set as described above, the corrected request axle torque may have a steady-state deviation in some cases as compared with the case without control.

In the above embodiments, the engine ECU 2 is taken as an example for controlling the engine power generated by the engine 1. Instead of providing an ECU exclusively for the engine as the engine ECU 2, there exists an integrated ECU for collectively controlling the other devices in addition to the engine, for example, for collectively controlling the engine, the transmission and the brake. The driving axle torque can be adjusted by such an integrated ECU so as to remove the pitching oscillation as described above.

On the other hand, each means realized by the above-described engine ECU 2 may be realized by any ECU in a distributed environment composed of a plurality of ECUs provided on a network, which can be found in recent years, or may be realized by functional decomposition to a plurality of ECUs.

In the above embodiments, the basic request axle torque corresponding to the physical quantity of the basic request driving force is obtained as the driving force (the request driving force) required by the driver. The corrected request axle torque obtained by correcting the basic request axle torque is obtained as a final request driving force. However, the driving force may be obtained as another physical quantity.

Moreover, although the output of the engine as a driving power source is operated as the driving power correcting means in the above examples, it is not necessarily limited thereto. A load of an auxiliary power source, an auxiliary machine or the like, which is capable of positively operating the driving shaft torque, may be used.

What is claimed is:

1. A vehicle stability control system, comprising:
a basic request driving force computing unit configured to compute a physical quantity corresponding to a basic request driving force so as to generate the basic request driving force requested by a driver for a driving wheel provided for a vehicle;
a front and rear wheel load computing unit configured to detect a ground load applied to each of front wheels and rear wheels in the vehicle;
a virtual turning radius estimating unit configured to estimate a virtual turning radius in the vehicle;
a target value computing unit configured to compute a target value of a stability factor based on the results of computations in the front and rear wheel load computing unit and the virtual turning radius estimating unit;
a running resistance disturbance estimating unit configured to estimate a running resistance disturbance applied to the wheels in the vehicle; and
a vibration damping correction controlling unit configured to correct a physical quantity corresponding to the basic request driving force computed by the basic request driving force computing unit so as to follow the target value computed by the target value computing unit, wherein
a driving force in accordance with the corrected physical quantity corrected by the vibration damping correction controlling unit is generated for the driving wheel,
the basic request driving force computing unit computes a basic request torque as the physical quantity corresponding to the basic request driving force,
the vibration damping correction controlling unit includes a state equation indicating a state quantity in the vehicle based on a sprung oscillation model in the vehicle and an output equation expressing the stability factor as the state quantity based on the state equation so as to correct the physical quantity corresponding to the basic request driving force based on a difference between the stability factor obtained from the output equation and the state quantity and the target value of the stability factor computed in the target value computing unit, and
the vibration damping correction controlling unit obtains the state quantity in the state equation in view of the running resistance disturbance estimated by the running resistance disturbance estimating unit so as to obtain the stability factor based on the obtained state quantity and the output equation and to obtain a difference between the stability factor and the target value.

2. The vehicle stability control system according to claim 1, wherein the running resistance disturbance estimating unit obtains a running resistance disturbance of the front wheel as the running resistance disturbance, based on a derivative value of a wheel speed of the front wheel provided for the vehicle and the weight of the vehicle.

3. The vehicle stability control system according to claim 1, wherein a difference between the target value of the stability factor and a current actual stability factor is computed, and a correction value of the driving force is obtained by an integral of the difference.

4. The vehicle stability control system according to claim 1, wherein a difference between an estimated axle torque and a corrected value of axle torque is obtained, and the difference is multiplied by a reduction ratio and then subtracted from a requested torque to obtain a corrected torque.

5. The vehicle stability control system according to claim 1, wherein the stability factor is stabilized to provide a turning radius in response to changes in detected by sensors in the vehicle stability control system.

* * * * *

UNITED STATES PATENT AND TRADEMARK OFFICE
CERTIFICATE OF CORRECTION

PATENT NO. : 7,577,504 B2  Page 1 of 1
APPLICATION NO. : 11/076295
DATED : August 18, 2009
INVENTOR(S) : Sawada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this

Seventh Day of September, 2010

David J. Kappos
*Director of the United States Patent and Trademark Office*